United States Patent
Wittenbreder, Jr.

(10) Patent No.: US 6,411,153 B2
(45) Date of Patent: *Jun. 25, 2002

(54) UNIVERSAL PULSE WIDTH MODULATED ZERO VOLTAGE TRANSITION SWITCHING CELL

(75) Inventor: Ernest Henry Wittenbreder, Jr., Flagstaff, AZ (US)

(73) Assignee: Technical Witts, Inc., Flagstaff, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/772,511

(22) Filed: Jan. 29, 2001

Related U.S. Application Data

(63) Continuation of application No. 09/587,598, filed on Jun. 5, 2000, now Pat. No. 6,198,260.

(51) Int. Cl.[7] ............................................. H03K 17/14
(52) U.S. Cl. ...................... 327/378; 327/309; 327/390; 327/419; 307/130
(58) Field of Search ................................ 327/309, 333, 327/390, 382, 378, 419, 436; 307/125, 130, 131

(56) References Cited

U.S. PATENT DOCUMENTS

| | | | | | |
|---|---|---|---|---|---|
| 4,313,065 A | * | 1/1982 | Yoshida et al. | ............. | 327/432 |
| 4,573,006 A | * | 2/1986 | Newton | ....................... | 307/110 |
| 5,612,615 A | * | 3/1997 | Gold et al. | ................. | 323/360 |
| 6,172,550 B1 | * | 1/2001 | Gold et al. | ................. | 327/110 |

* cited by examiner

Primary Examiner—Terry D. Cunningham

(57) ABSTRACT

A universal zero voltage transition switching cell using a small choke, a pair of switches, and a capacitor is revealed. The application of the universal zero voltage transition switching cell to any of a wide variety of hard switching pulse width modulated power converter topologies yields identical power converters with zero voltage switching properties, without the requirement that the magnetizing current in the main power choke be reversed during each switching cycle. In the subject invention the energy required to drive the critical zero voltage switching transition is provided by the small choke that forms part of the universal zero voltage transition switching cell. The application of the universal zero voltage transition switching cell to buck, boost, buck boost, Cuk, Wittenbreder, flyback, forward, and SEPIC converters is shown. A variation of the universal zero voltage transition switching cell which adds a single diode to clamp ringing associated with the parasitic capacitance of off switches is also revealed.

2 Claims, 37 Drawing Sheets

UNIVERSAL PULSE WIDTH MODULATED ZERO VOLTAGE TRANSITION SWITCHING CELL

This invention is a continuation of application Ser. No. 09/587,598 filed Jun. 5, 2000 now U.S. Pat. No. 6,198,260.

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish higher efficiencies by implementing a mechanism that accomplishes switching at zero voltage. Power loss in a switch is the product of the voltage applied across the switch and the current flowing through the switch. In a switching power converter, when the switch is in the on state, the voltage across the switch is zero, so the power loss is zero. When the switch is in the off state, the power loss is zero, because the current through the switch is zero. During the transition from on to off, and vice versa, power losses can occur, if there is no mechanism to switch at zero voltage or zero current. During the switching transitions, energy losses will occur if there is simultaneously (1) non-zero voltage applied across the switch and (2) non-zero current flowing through the switch. The energy lost in each switching transition is equal to the time integral of the product of switch voltage and switch current. The power losses associated with the switching transitions will be the product of the energy lost per transition and the switching frequency. The power losses that occur because of these transitions are referred to as switching losses by those people who are skilled in the art of switching power converter design. In zero voltage switching converters the zero voltage turn off transition is accomplished by turning off a switch in parallel with a capacitor and a diode when the capacitor's voltage is zero. The capacitor maintains the applied voltage at zero across the switch as the current through the switch falls to zero. In the zero voltage transition the current in the switch is transferred to the parallel capacitor as the switch turns off.

The zero voltage turn on transition is accomplished by discharging the parallel capacitor using the energy stored in a magnetic circuit element, such as an inductor or transformer, and turning on the switch after the parallel diode has begun to conduct. During the turn on transition the voltage across the switch is held at zero, clamped by the parallel diode. The various zero voltage switching (ZVS) techniques differ in the control and modulation schemes used to accomplish regulation, in the energy storage mechanisms used to accomplish the zero voltage turn on transition, and in a few cases on some unique switch timing mechanisms.

One of the ZVS techniques uses an inductor or transformer with relatively low inductance so that the inductor current reverses sign during each switching cycle. An example of a buck converter with this property is shown in FIG. 1 and its wave forms are illustrated in FIG. 2. One advantage of this technique is that the switching transitions are all zero voltage transitions driven by the stored energy and current in the inductor. Another advantage is that the inductor can be made small and the inductance needs to be small in order that the current can be reversed during each switching cycle. The disadvantages are that the output current reverses each cycle so that the output capacitor must be relatively large and must store a substantial amount of energy and be able to accommodate the large ripple currents. During the time that the inductor current is negative the output capacitor must supply the current to the inductor as well as providing current to the load. Although the inductor can be made smaller because the inductance is reduced, the size reduction of the inductor is not as large as might be suggested by the reduction in inductance value. In a typical hard switching buck converter the output choke would be saturation limited. Its core losses would be small by comparison to its copper losses. With a small value inductor with large current swings the inductor will more likely be core loss limited, so that the cross section, the core gap, and the number of turns would need to be increased to reduce the flux swing and associated core losses. Also, in the typical hard switching buck converter in which the inductor current has a large DC component and a small AC component the AC copper winding losses are typically small. In the FIG. 1 circuit the issue of AC winding losses must be addressed by suitable magnetic circuit element design (Litz wire or properly placed and oriented copper foil or strip) or AC winding losses will be substantial. Another disadvantage of the small inductance value technique is that there will be much higher peak currents in the choke winding and in the switches which will result in additional conduction losses in those elements. Another disadvantage of the small inductance value technique is that the energy and current available to drive the zero voltage transitions decreases as the load current increases so that in an over load condition there may be no energy available to drive a zero voltage transition and there may be substantial switching losses at the same time that the conduction losses are at their highest levels. In general, almost any power converter can be made to have zero voltage switching by this mechanism. That is, almost any power converter can be designed so that the current in its principal magnetic energy storage circuit element(s) reverses each cycle so that the stored energy in its magnetic storage element(s) is directed in a way which will enable a zero voltage transition on every switching transition.

OBJECTS AND ADVANTAGES

An object of the subject invention is to provide a power converter which is relatively simple and is capable of delivering high output power at high efficiencies and high switching frequencies.

Another object is to provide a converter design with minimal snubber requirements and superior EMI performance.

Another object is to provide a simple resonant transition converter design that can be readily used with the single frequency pulse width modulated controller integrated circuits.

Another object is to provide a resonant switching transition mechanism which can be designed to provide zero voltage switching over the full range of line voltage and load conditions.

Another object is to provide a generalized resonant switching mechanism that can be universally applied to a wide variety of simple non-isolated and isolated converter topologies.

Another object is to provide a high power conversion scheme with reduced conduction losses.

Another object is to provide a high frequency soft switching converter with low output filter capacitor requirements.

Another object is to provide a universal zero voltage transition switching cell that does not alter the current and voltage wave forms, which would otherwise increase component stress, in the circuit elements of the converter external to the switching cell.

Further objects and advantages of my invention will become apparent from a consideration of the drawings and ensuing description.

These and other objects of the invention are provided by a novel circuit technique that uses a universal zero voltage transition switching cell consisting of two switches, a reset capacitor, and a small resonator choke. The critical zero voltage switching transitions are accomplished using the stored magnetic energy in the small resonator choke.

Figure 1:
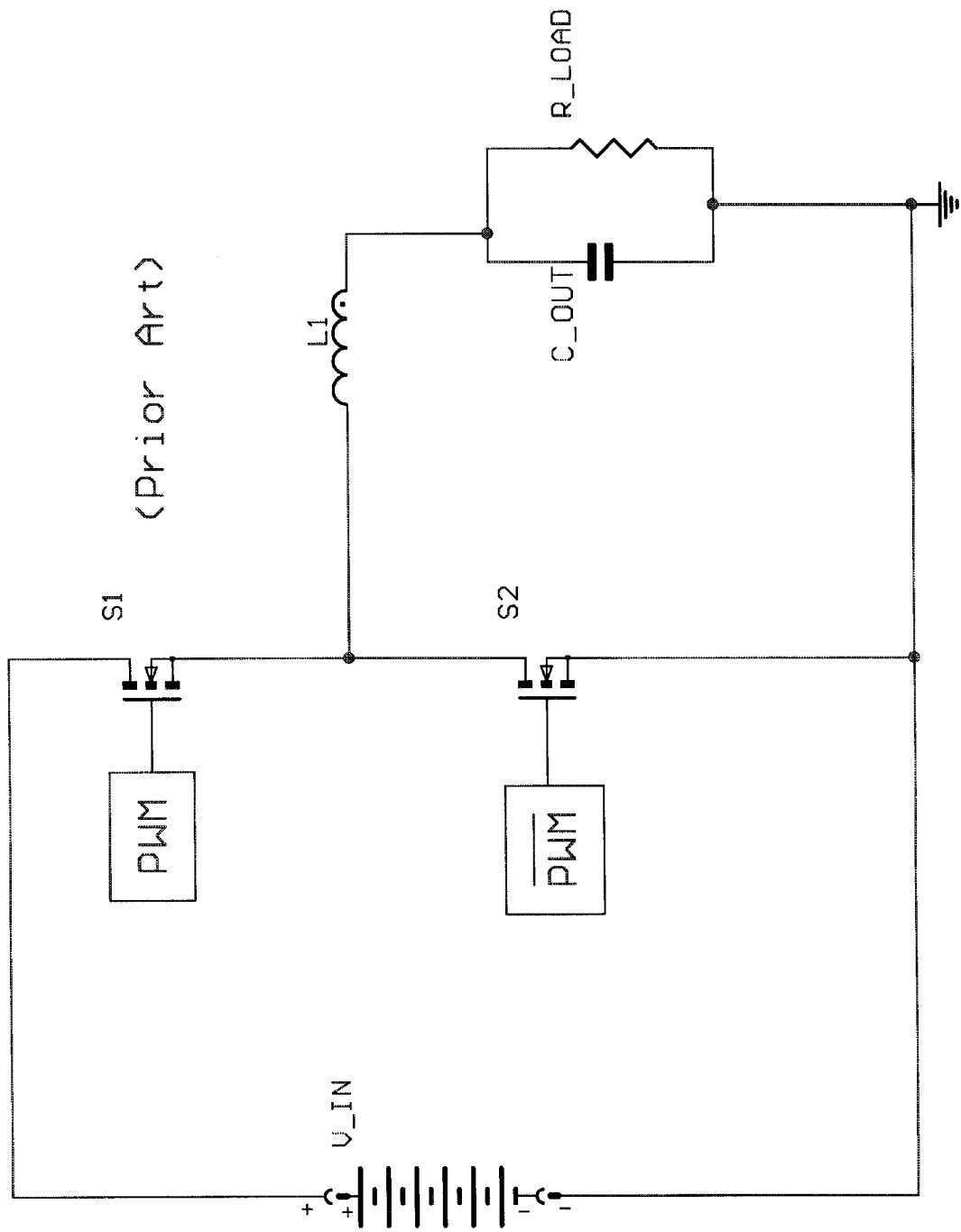
FIG. 1 illustrates a circuit schematic drawing of a prior art zero voltage switching buck converter in which the inductor current is reversed each cycle in order to provide a properly directed current for driving a zero voltage switching transition.
Figure 2:
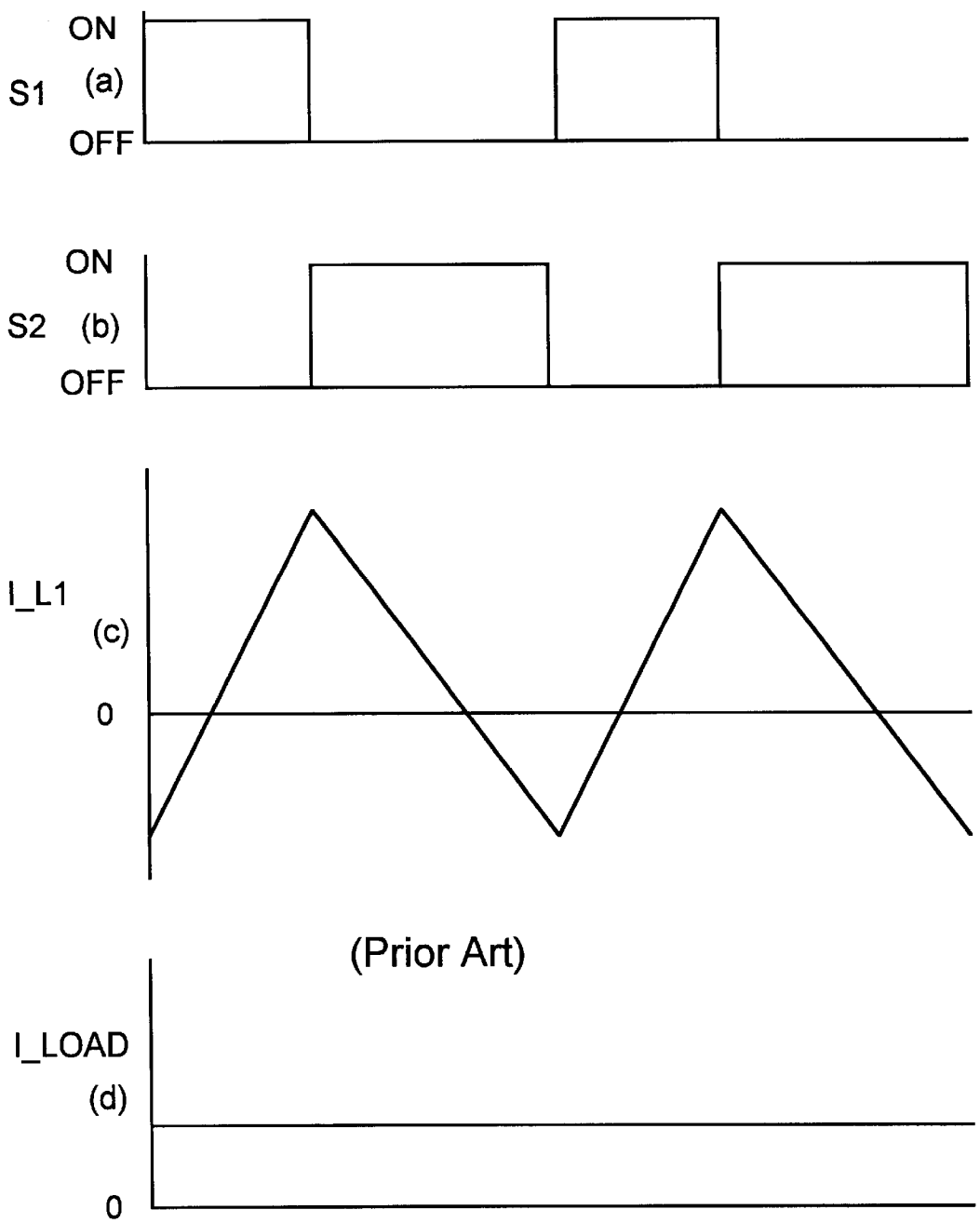
FIG. 2 illustrates the switch timing and current wave forms of the FIG. 1 circuit.

| Reference Numerals | |
| --- | --- |
| 100 DC input voltage source | 101 node |
| 102 node | 103 lead |
| 104 lead | 105 node |
| 107 capacitor | 108 switch |
| 109 diode | 110 capacitor |
| 111 switch | 112 diode |
| 113 node | 114 node |
| 115 lead | 116 lead |
| 117 node | 118 inductor |
| 119 node | 121 node |
| 122 capacitor | 123 switch |
| 124 diode | 125 inductor |
| 126 lead | 127 node |
| 128 node | 129 capacitor |
| 130 load | 131 capacitor |
| 132 capacitor | 133 node |

SUMMARY

The subject invention uses a universal zero voltage transition switching cell consisting of two switches, a capacitor, and a small inductor in a variety of converter topologies as a substitute for the main switch to form zero voltage switching converters with identical properties to the original hard switching forms of the converters, except that first order switching losses are eliminated. During the off time of each switching cycle the current in the small inductor of the universal zero voltage transition switching cell reverses direction so that there is energy available in the small inductor to drive every switching transition.

DESCRIPTION OF THE PREFERRED EMBODIMENTS

Figure 3:
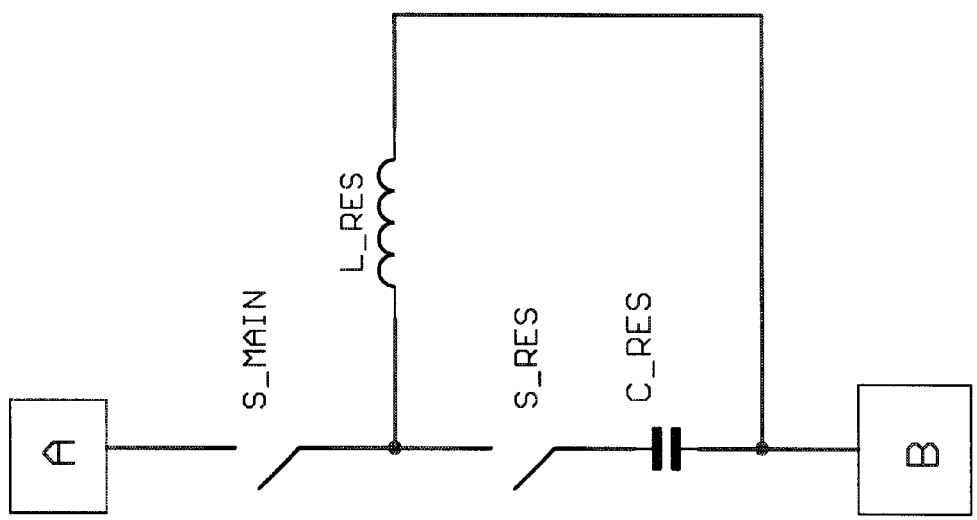
FIG. 3 illustrates the universal zero voltage transition switching cell of the subject invention.
Figure 4:
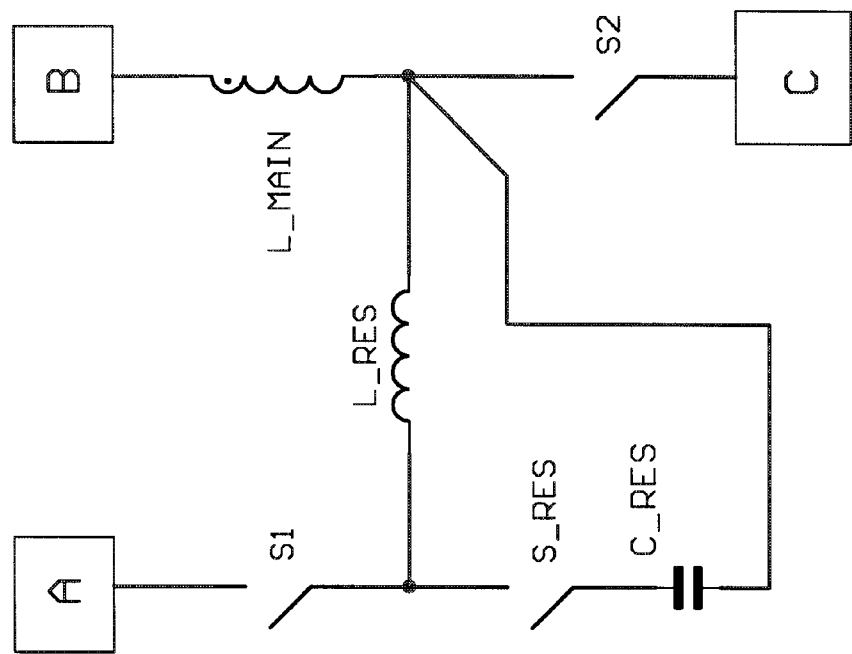
FIG. 4 illustrates a generalized single main choke converter using the universal zero voltage transition switching cell of FIG. 3.
Figure 5:
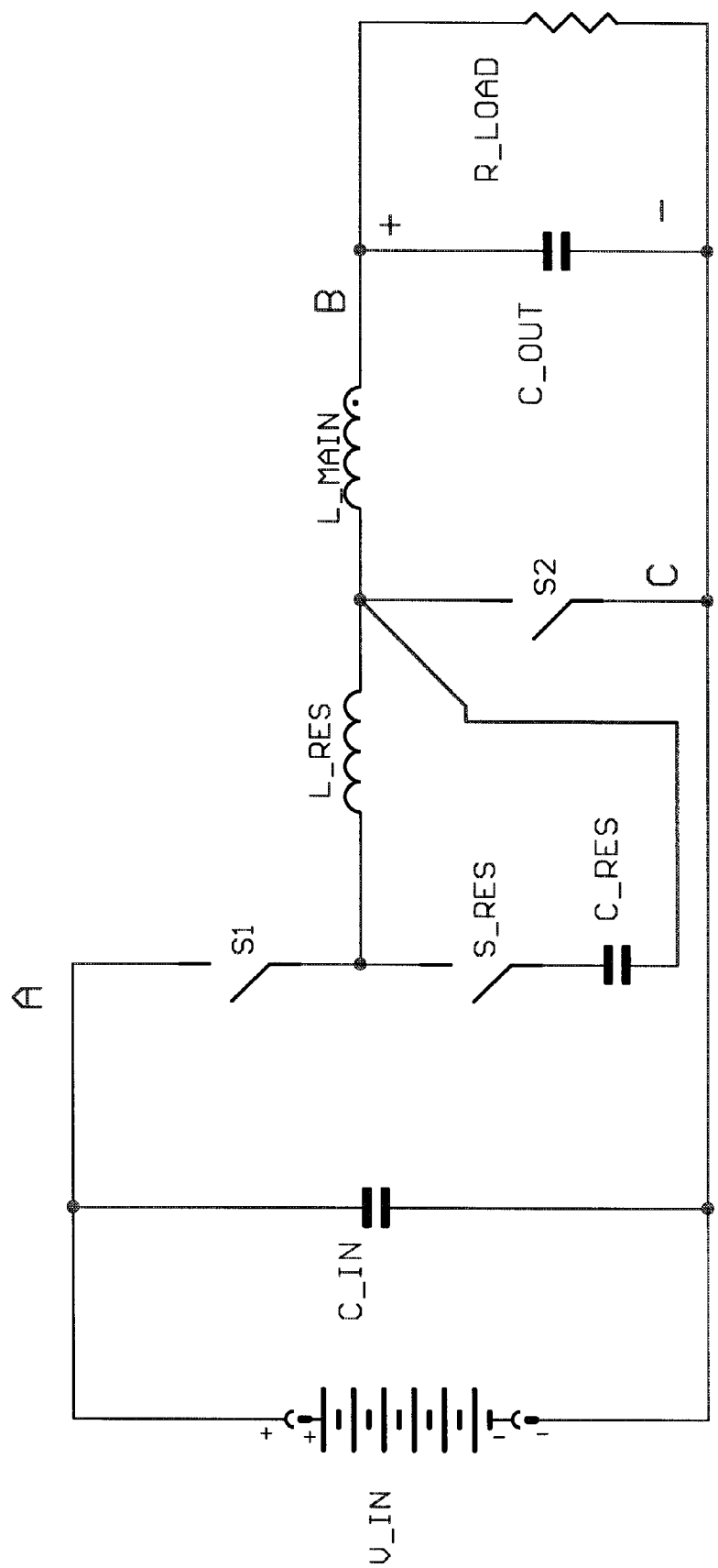
FIG. 5 illustrates the FIG. 4 circuit applied to form a buck converter.
Figure 6:
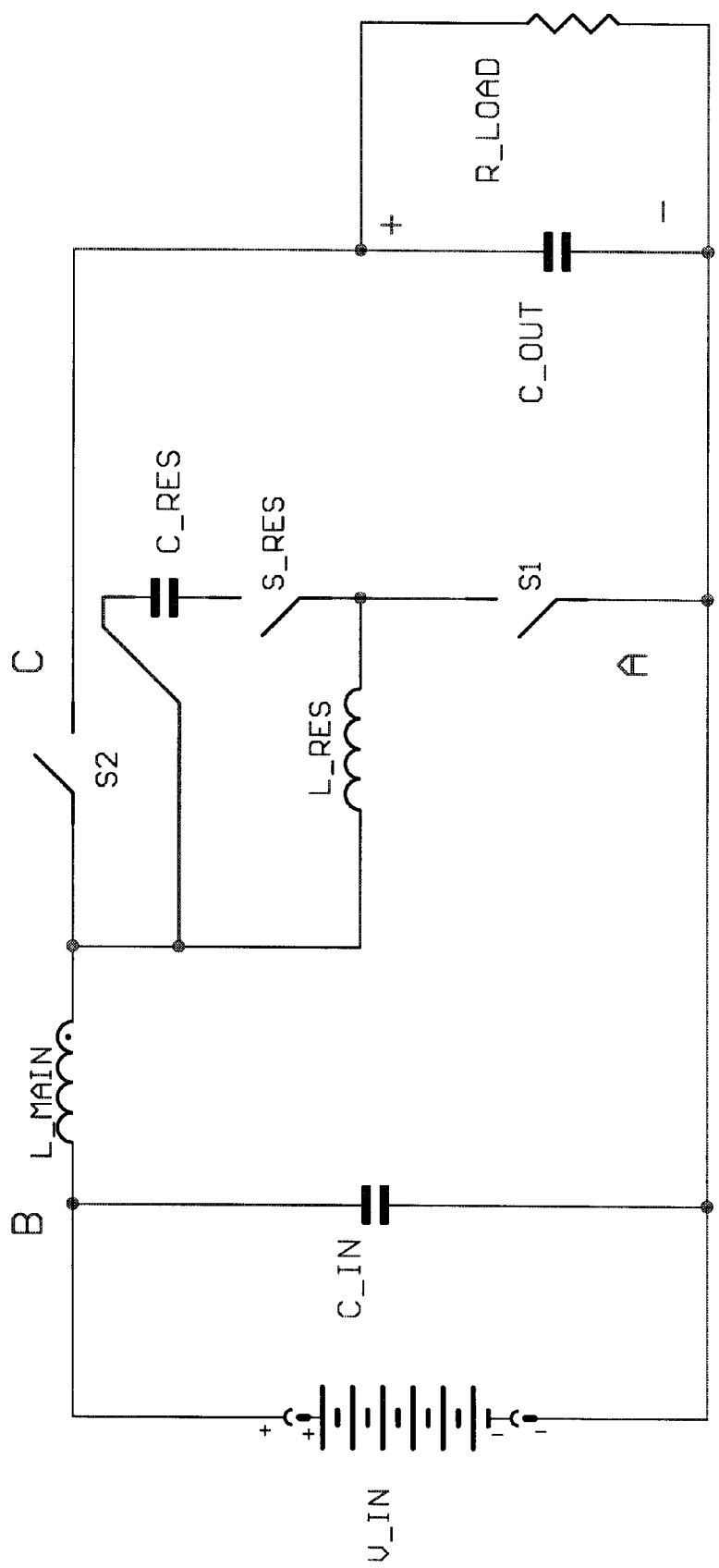
FIG. 6 illustrates the FIG. 4 circuit applied to form a boost converter.
Figure 7:
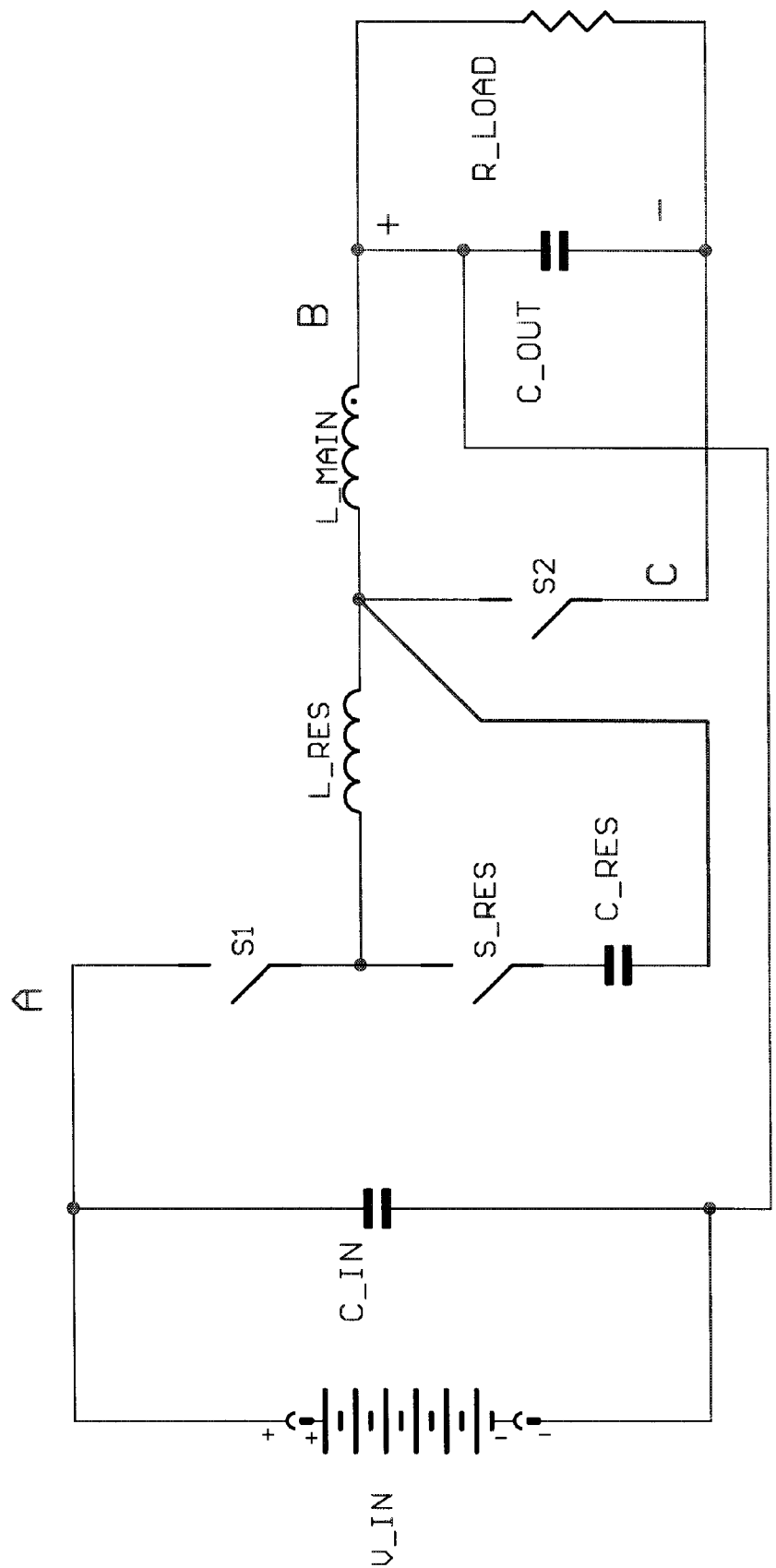
FIG. 7 illustrates the FIG. 4 circuit applied to form a buck boost converter.
Figure 8:
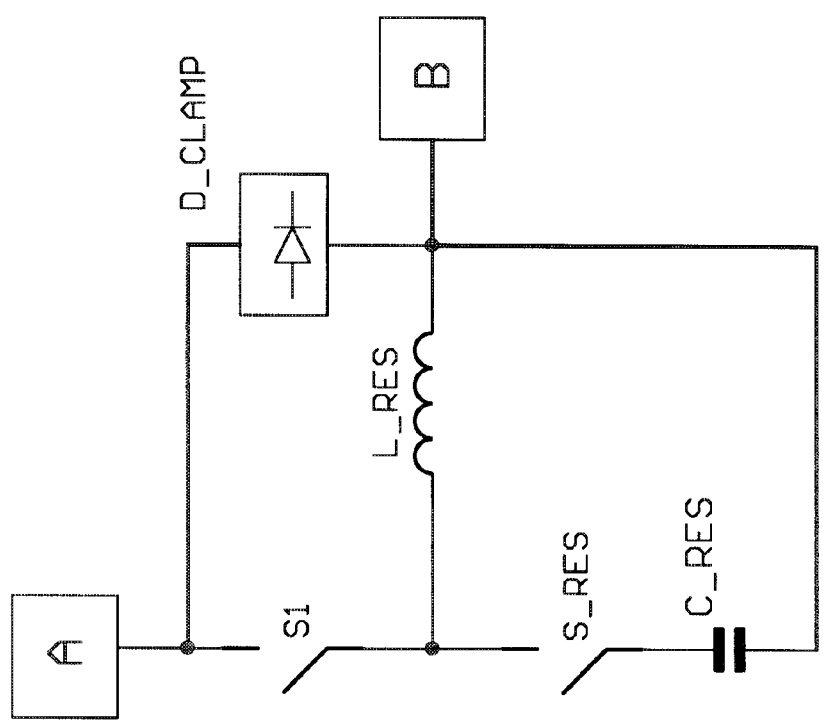
FIG. 8 illustrates the universal zero voltage transition switching cell augmented by a rectifier whose purpose is to clamp ringing associated with the small inductor.
Figure 9:
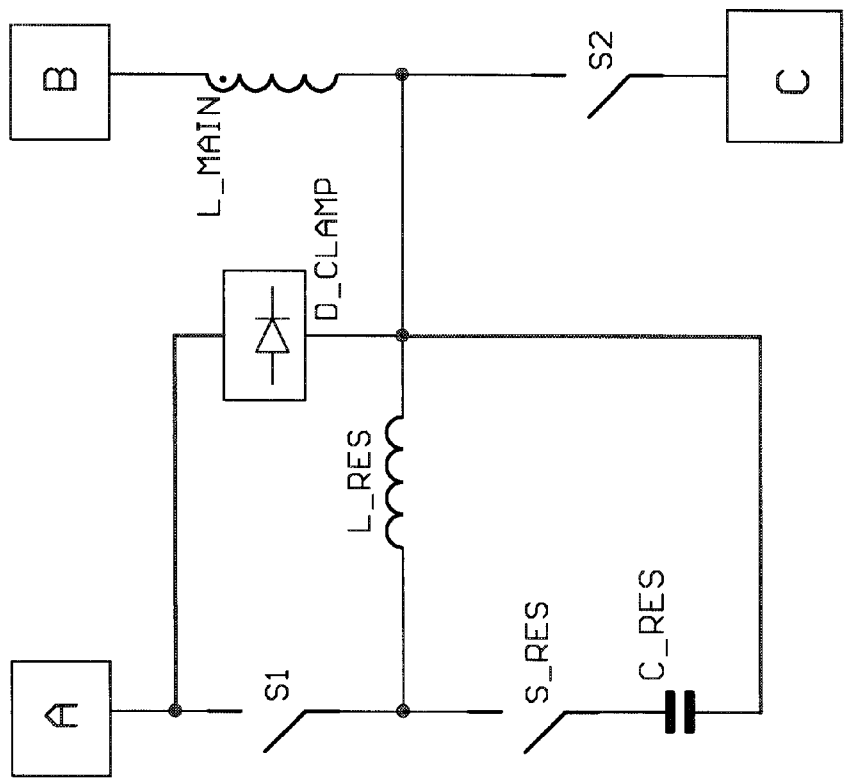
FIG. 9 illustrates a generalized single main choke power converter using the universal zero voltage transition switching cell of FIG. 8.
Figure 10:
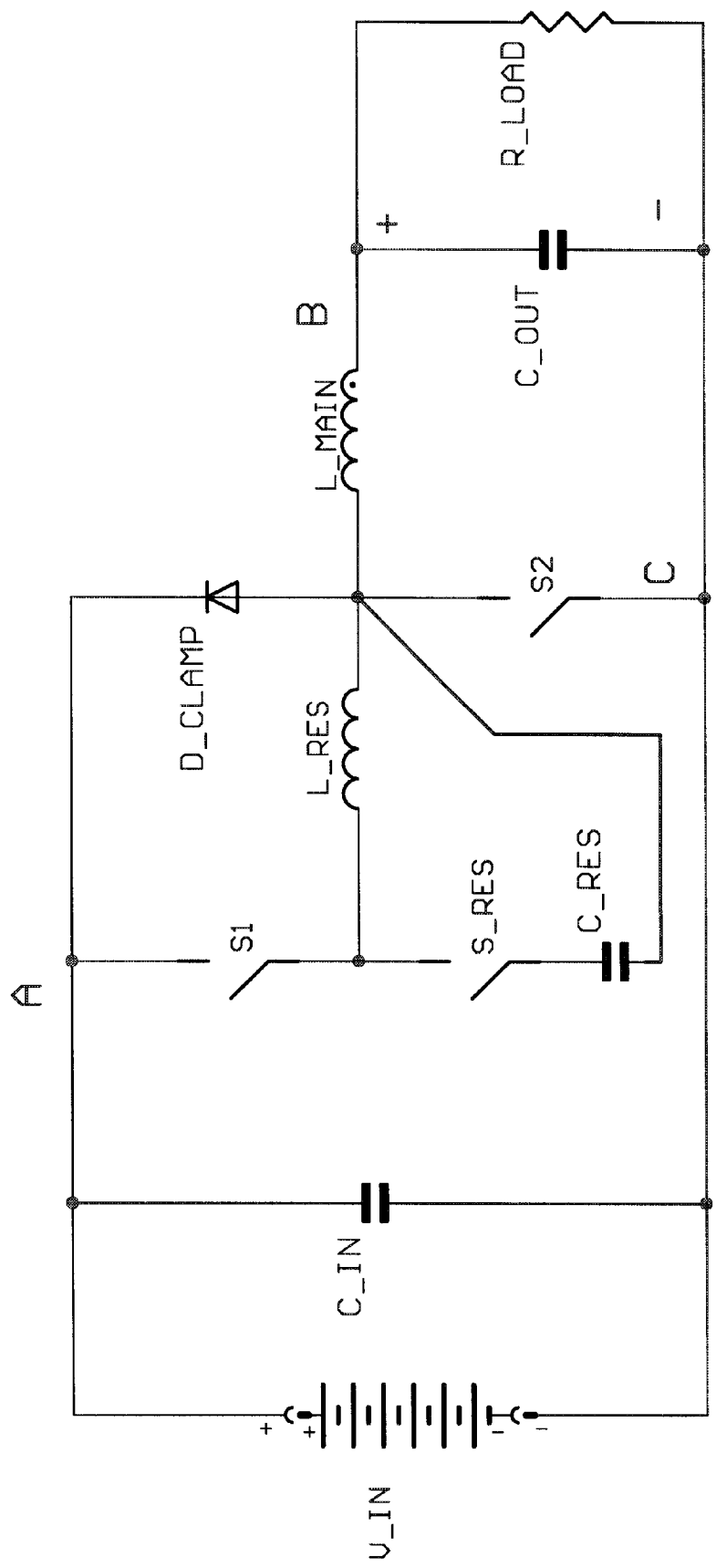
FIG. 10 illustrates the circuit of FIG. 9 applied to form a buck converter.

FIG. 3 illustrates a universal zero voltage transition switching cell which can be used to provide zero voltage switching to a wide variety of hard switching converter topologies. FIG. 4 illustrates a generalized single inductor power converter based on the universal zero voltage transition switching cell which can be made to be either a buck, boost, or buck boost converter by appropriate selection of connection of the terminals. FIG. 5 illustrates a buck converter using the universal zero voltage transition switching cell. FIG. 6 illustrates a boost converter using the universal zero voltage transition switching cell. FIG. 7 illustrates a buck boost converter using the universal zero voltage transition switching cell. FIG. 8 illustrates an improvement to the switching cell that provides a clamp for potential ringing that would occur at the junction of the diode and the inductor when switch 2 is off (open). FIG. 9 illustrates a generalized power converter based on the modified universal zero voltage transition switching cell of FIG. 8. FIG. 10 illustrates a buck converter based on the modified universal zero voltage transition switching cell.

Figure 11:
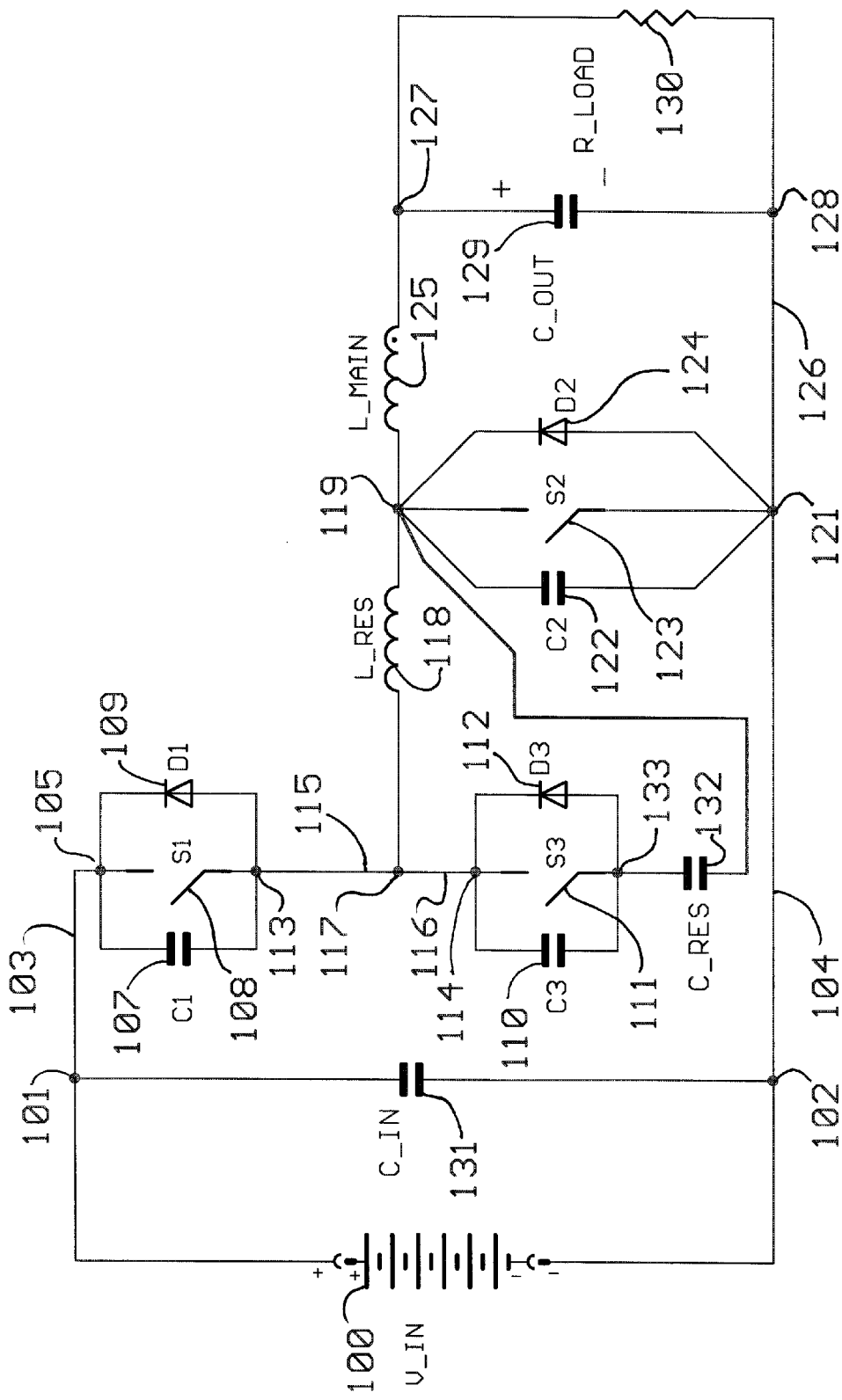
FIG. 11 illustrates a buck implementation of the subject invention.

Referring to FIG. 11, there is shown a series type power processing topology. The circuit employs a source of substantially DC voltage, a switching network consisting of three switches, a reset capacitor, a small resonator inductor, a main choke, a main filter capacitor, an input capacitor, and a load. For purposes of the operational state analysis, it is assumed that the reset and output filter capacitors are sufficiently large that the voltages developed across the capacitors are approximately constant over a switching interval. It is also assumed that the main choke is sufficiently large that the current in the main choke is approximately constant over a switching cycle. Also for purposes of the operational state analysis, it is assumed that the input DC voltage source has sufficiently low source impedance that the voltage developed across the input DC voltage source is approximately constant over a switching interval. It will be assumed that the parasitic capacitors that parallel the switches are small and their effects can be ignored, except during the switching transitions. It will be assumed that diodes are ideal and have no leakage and no forward voltage drop. It will finally be assumed that the power switches are ideal; that is, lossless and able to carry current in either direction.

Structure

The structure of the circuit of the subject invention is shown in FIG. 11. A positive terminal of an input source of DC potential 100 is connected to a node 101. A negative terminal of source 100 is connected to a node 102. A first terminal of an input capacitor 131 is connected to the node 101. A second terminal of capacitor 131 is connected to node 102. A lead 103 is connected to node 101 and a node 105. A lead 104 is connected to node 102 and to a node 121. A first terminal of a capacitor 107 is connected to node 105. A second terminal of capacitor 107 is connected to a node 113. A first terminal of a switch 108 is connected to node 105. A second terminal of a switch 108 is connected to node 113. A cathode terminal of a diode 109 is connected to node 105. An anode terminal of diode 109 is connected to node 113. A lead 115 is connected to node 113 and to a node 117. A first terminal of an inductor 118 is connected to node 117. A second terminal of inductor 118 is connected to a node 119. A first terminal of a reset capacitor 132 is connected to node 119. A second terminal of capacitor 132 is connected to a node 133. A first terminal of a capacitor 110 is connected to node 133. A second terminal of capacitor 110 is connected to a node 114. A first terminal of a switch 111 is connected to node 133. A second terminal of switch 111 is connected to node 114. An anode terminal of a diode 112 is connected to node 133. A cathode terminal of diode 112 is connected to node 114. A lead 116 is connected to node 114 and to node 117. An anode terminal of a diode 124 is connected to node 121. A cathode terminal of diode 124 is connected to node 119. A first terminal of a switch 123 is connected to node 121. A second terminal of switch 123 is connected to node 119. A first terminal of a capacitor 122 is connected to node 121. A second terminal of capacitor 122 is connected to node 119. A first terminal of a choke 125 is connected to node 119. A second terminal of choke 125 is connected to a node 127. A lead 126 is connected to node 121 and to a node 128. A first terminal of a capacitor 129 is connected to node 127. A second terminal of capacitor 129 is connected to node 128. A first terminal of a load 130 is connected to node 127. A second terminal of load 130 is connected to node 128.

Operation

It is assumed in this analysis that the system has reached a settled operating condition. Except for the short, but finite, switching intervals there are two states of the circuit of FIG. 11, an on state and an off state. It is also assumed, for purpose of analysis, that the switching intervals between the states are approximately zero seconds and that capacitors 107, 110, and 122 are small and do not contribute significantly to the operation of the converter, except during the brief switching transitions. It is also assumed that the capacitors 131, 132, and 129 are large and the voltages on these capacitors are constant over a switching cycle.

Figure 12:
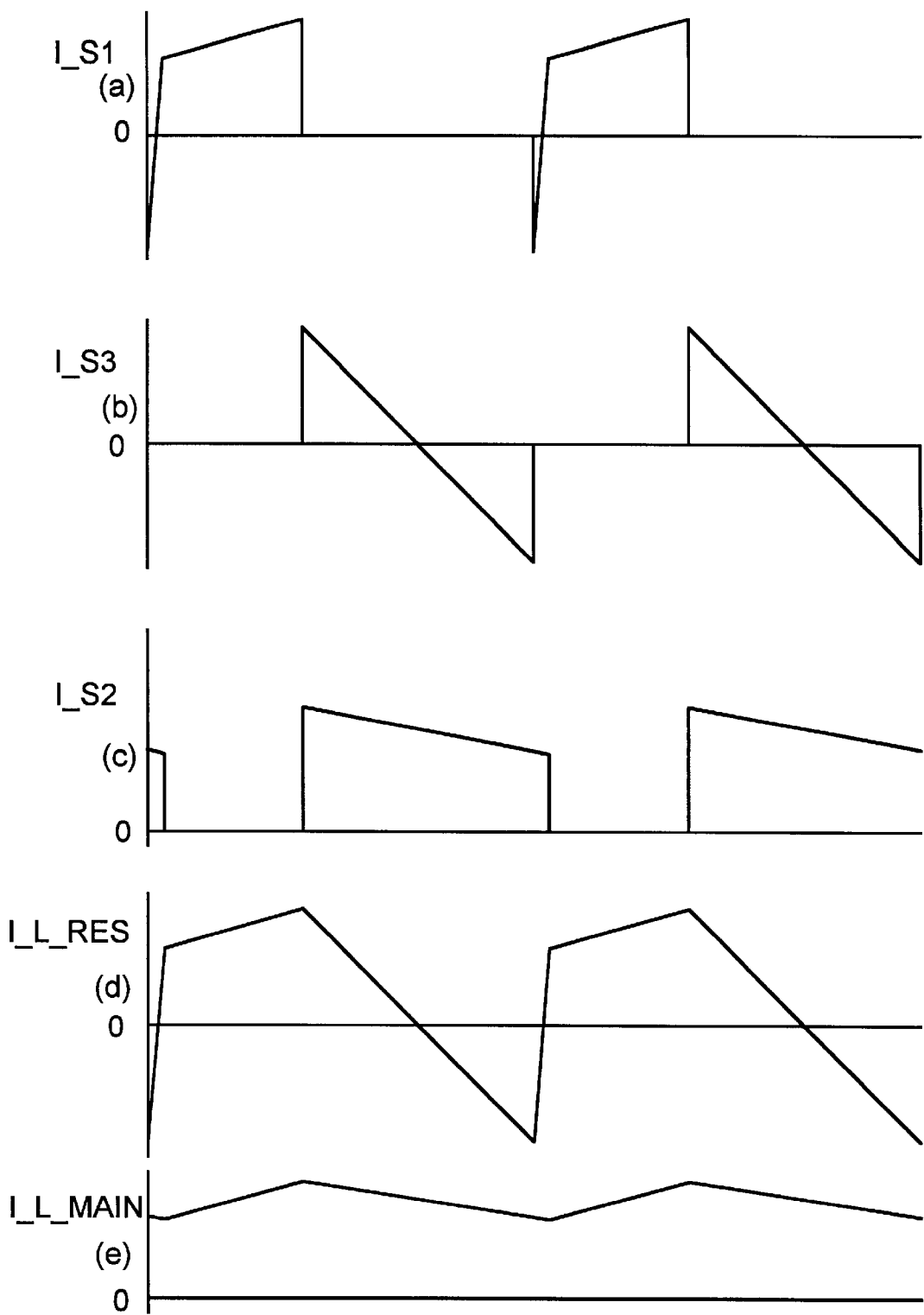
FIG. 12 illustrates switch and inductor current wave forms of the FIG. 11 circuit.
Figure 13:
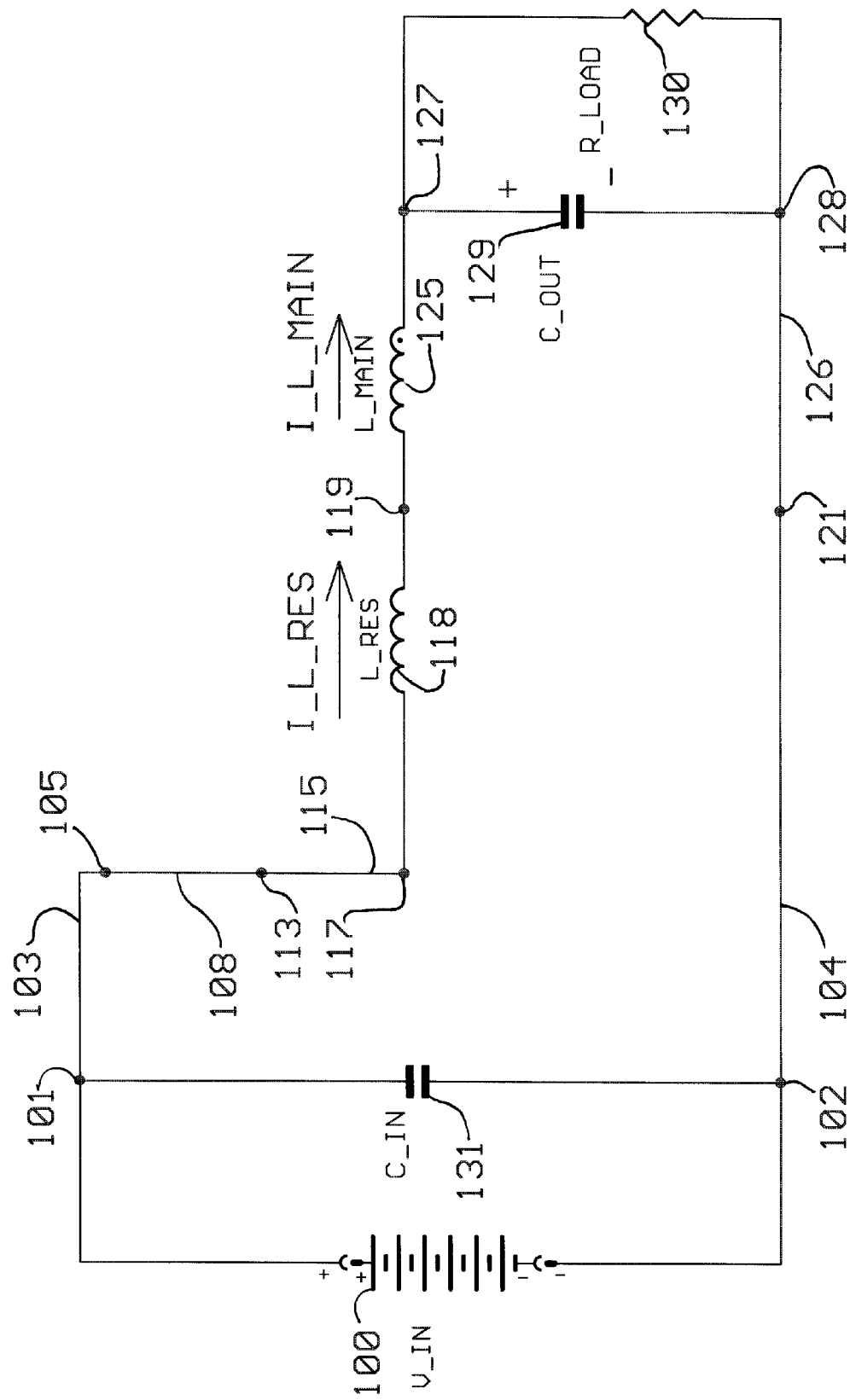
FIG. 13 illustrates an initial condition and on state of the FIG. 11 circuit.
Figure 14:
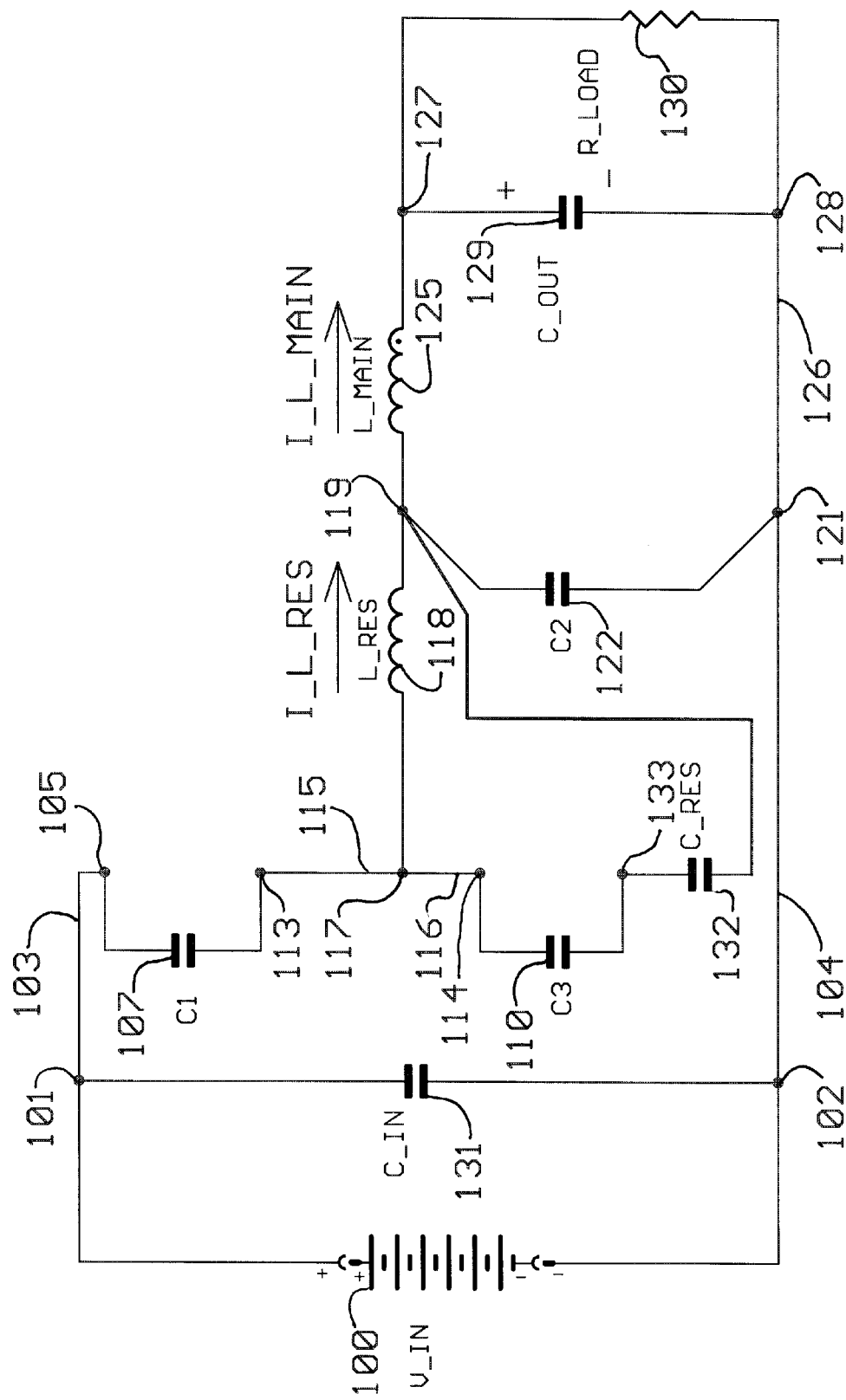
FIG. 14 illustrates a first phase of a turn off transition of the FIG. 11 circuit.
Figure 15:
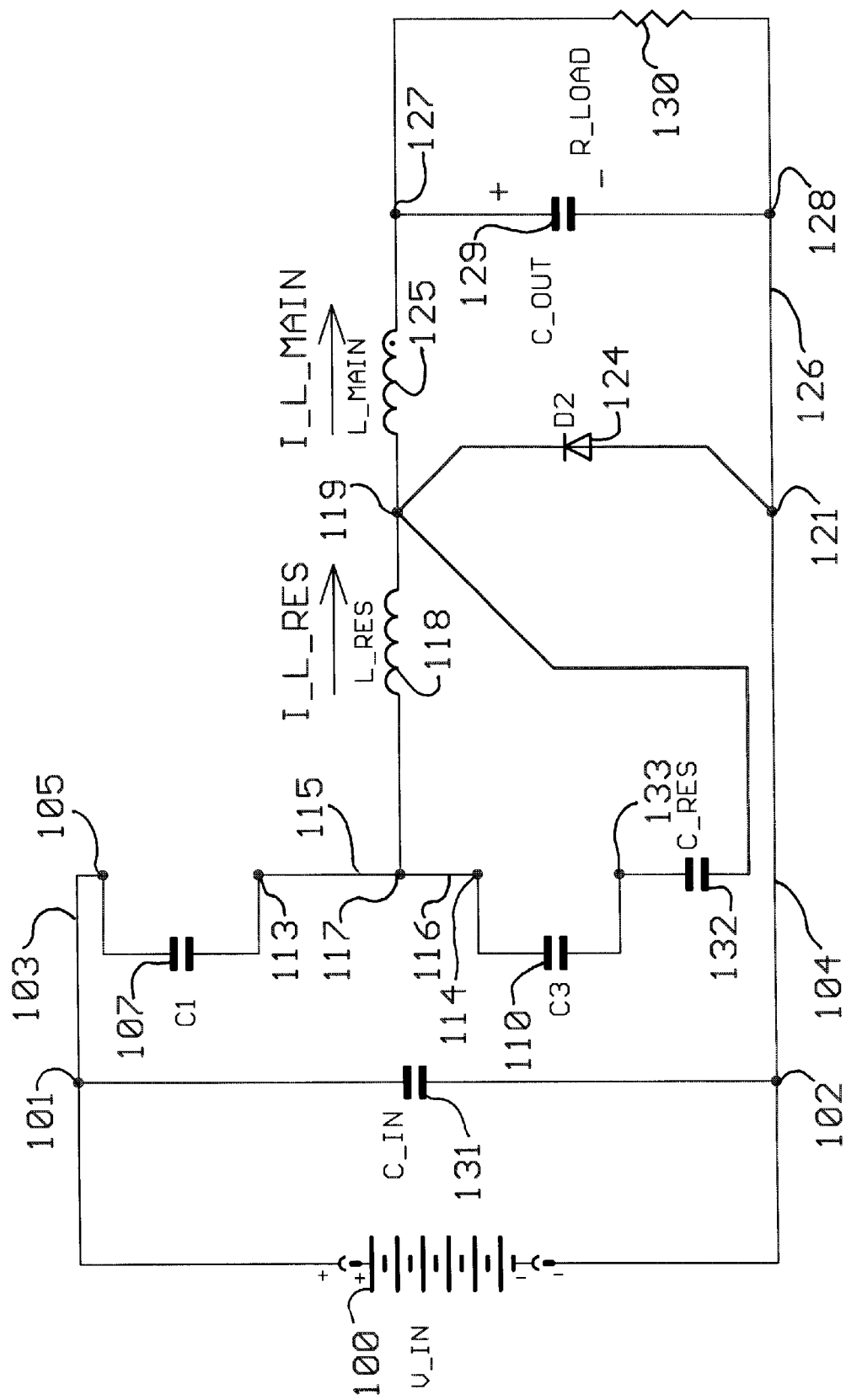
FIG. 15 illustrates a second phase of a turn off transition of the FIG. 11 circuit.
Figure 16:
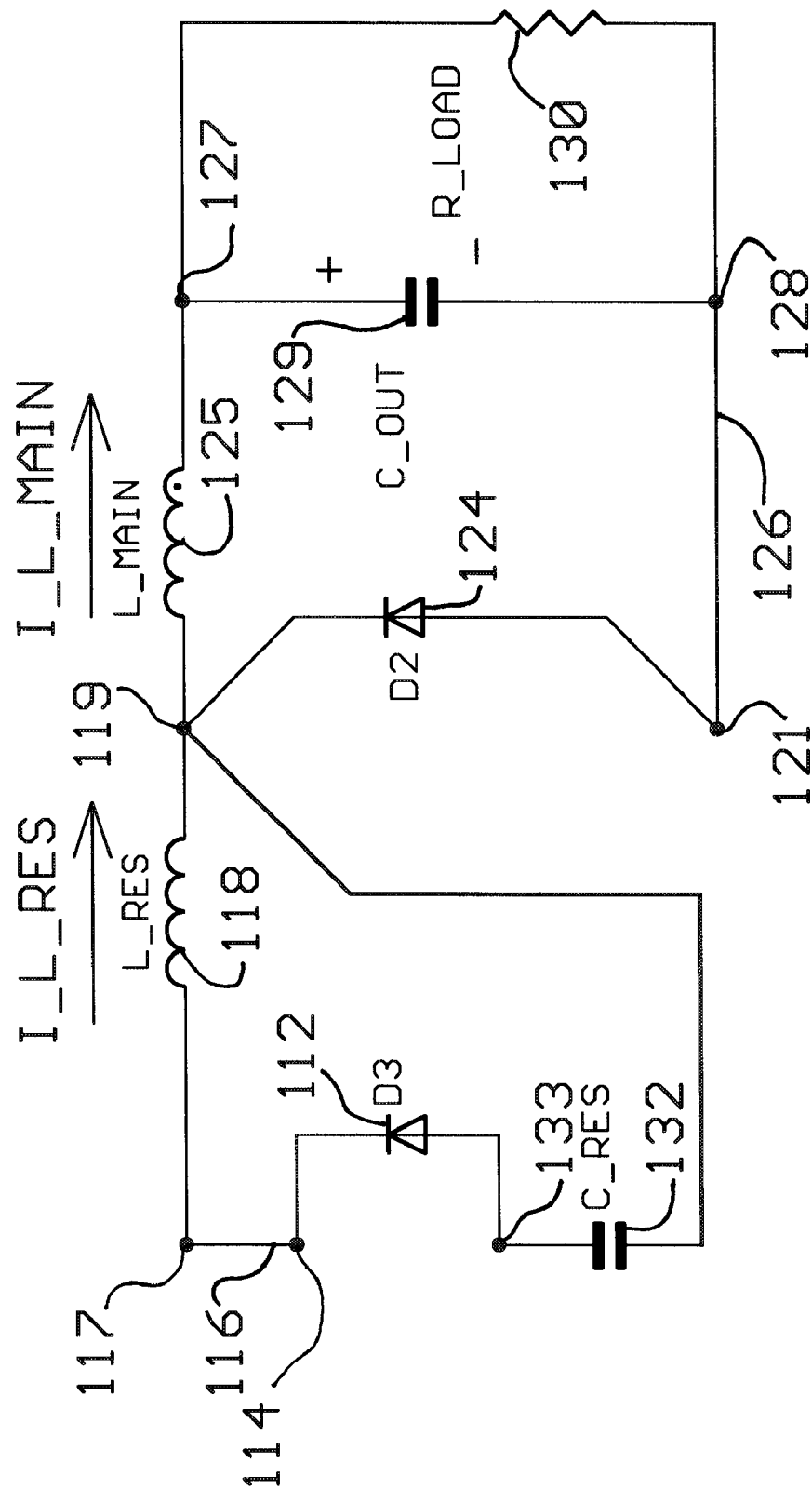
FIG. 16 illustrates a third phase of a turn off transition of the FIG. 11 circuit.
Figure 17:
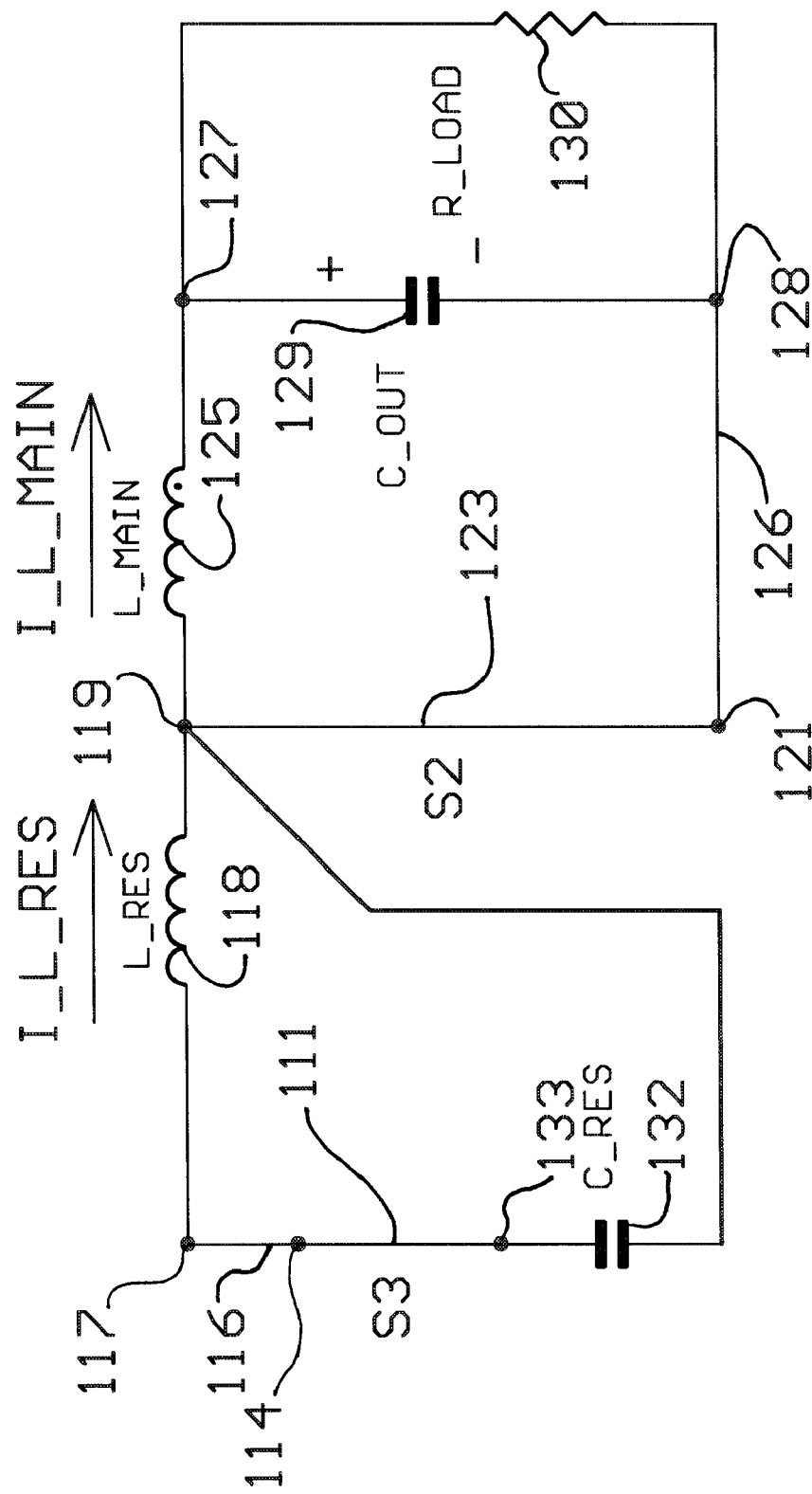
FIG. 17 illustrates the off state of the FIG. 11 circuit.
Figure 18:
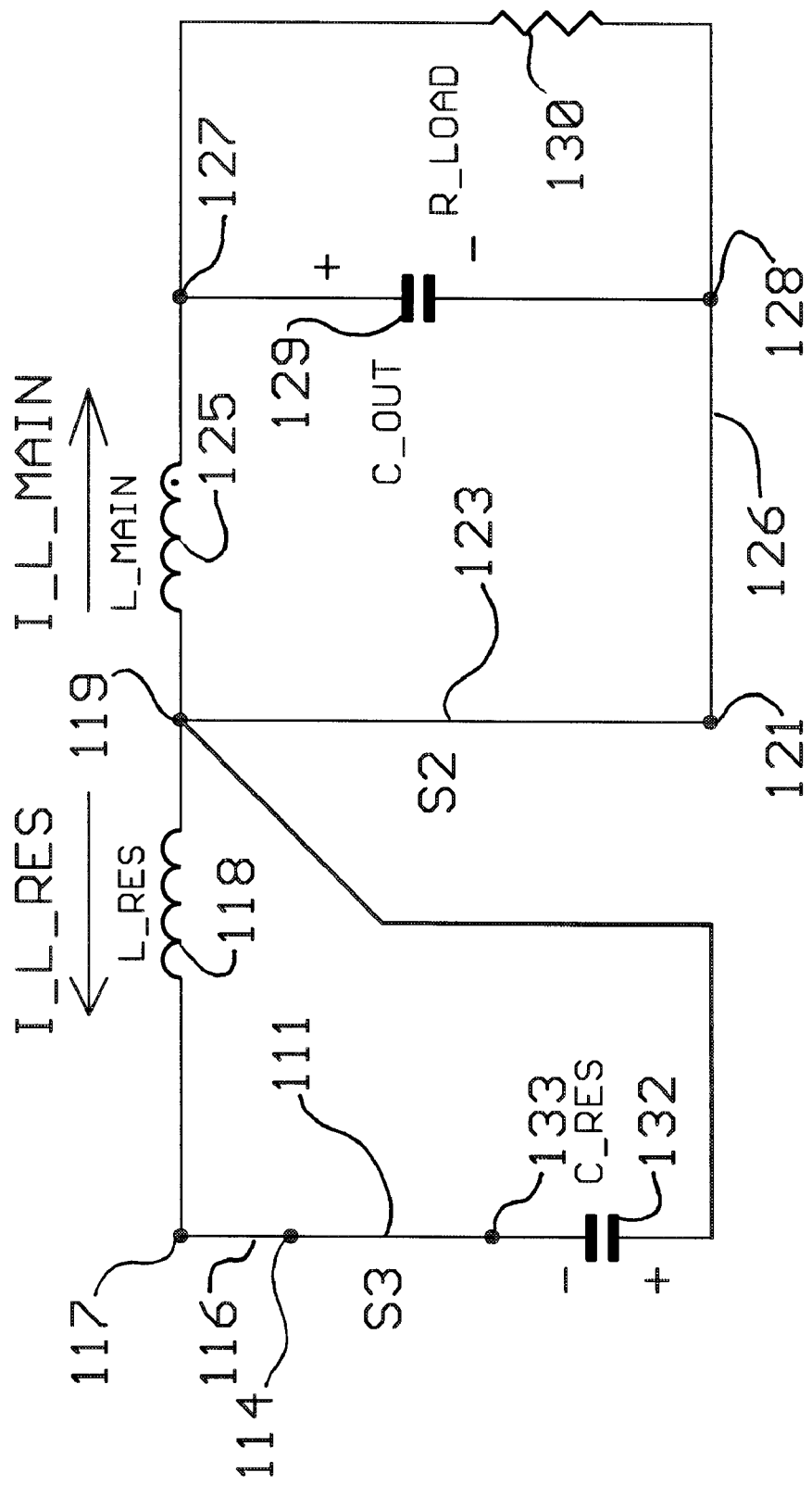
FIG. 18 is another illustration of the off state of the FIG. 11 circuit.
Figure 19:
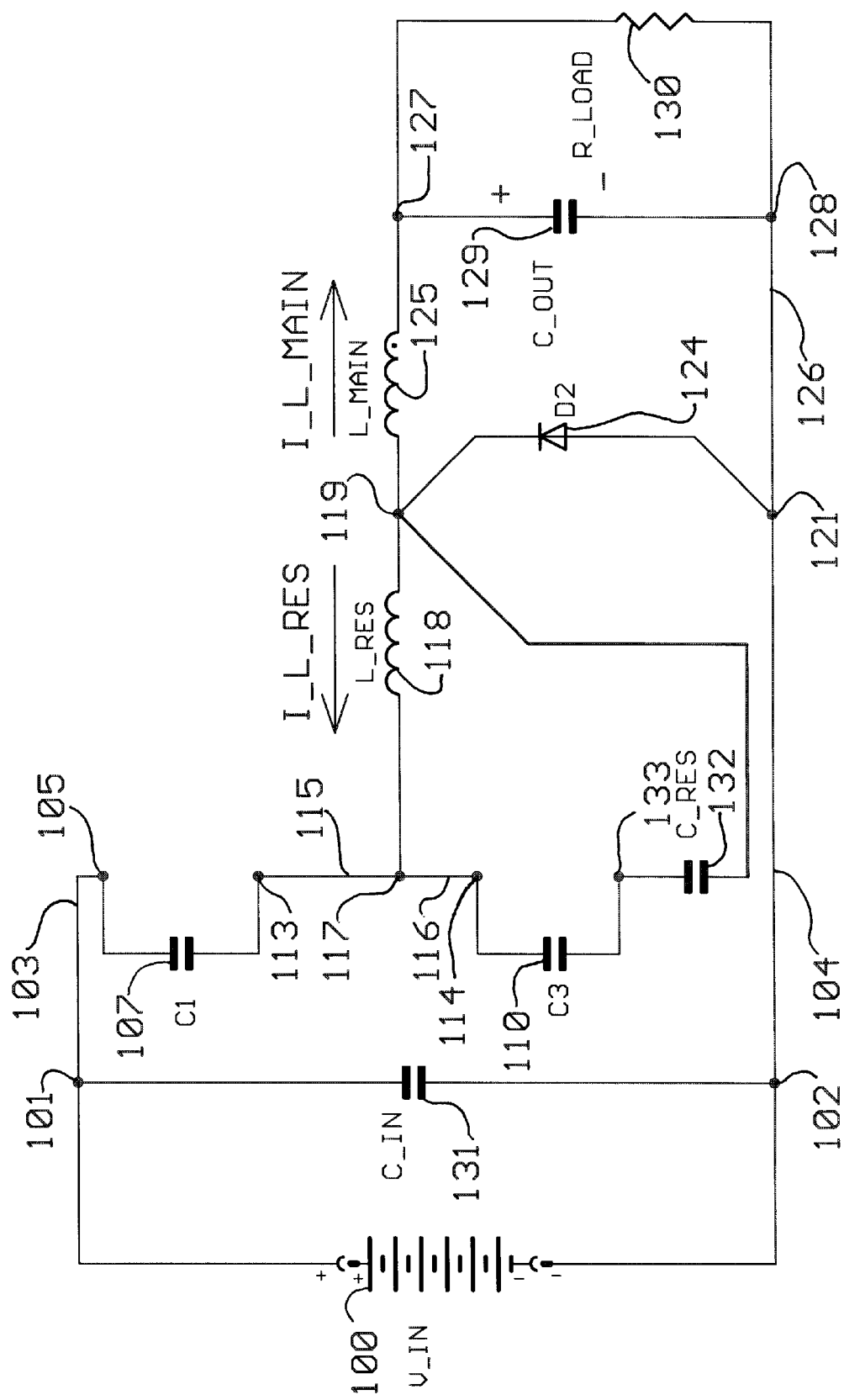
FIG. 19 illustrates a first phase of a turn on transition of the FIG. 11 circuit.
Figure 20:
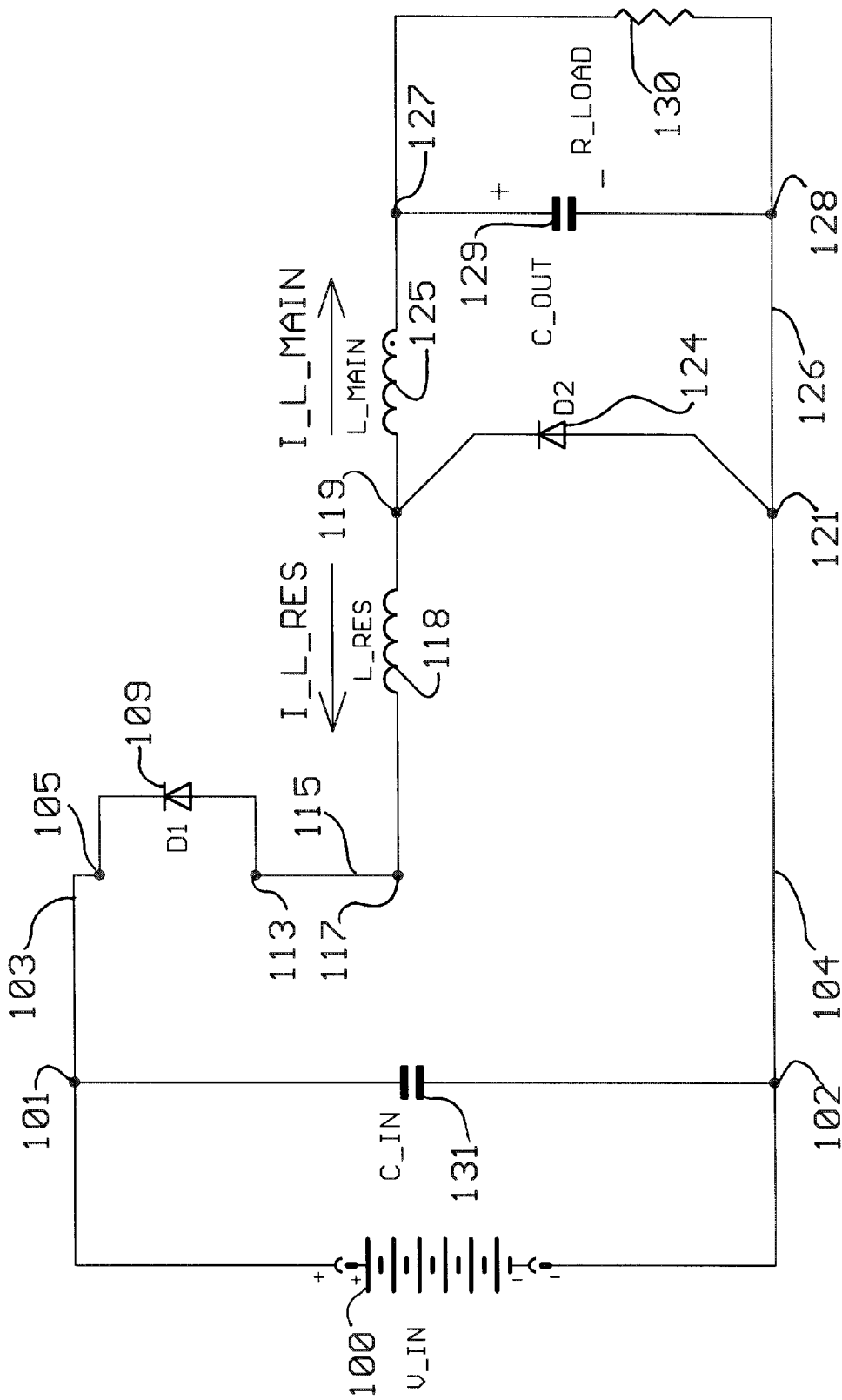
FIG. 20 illustrates a second phase of a turn on transition of the FIG. 11 circuit.
Figure 21:
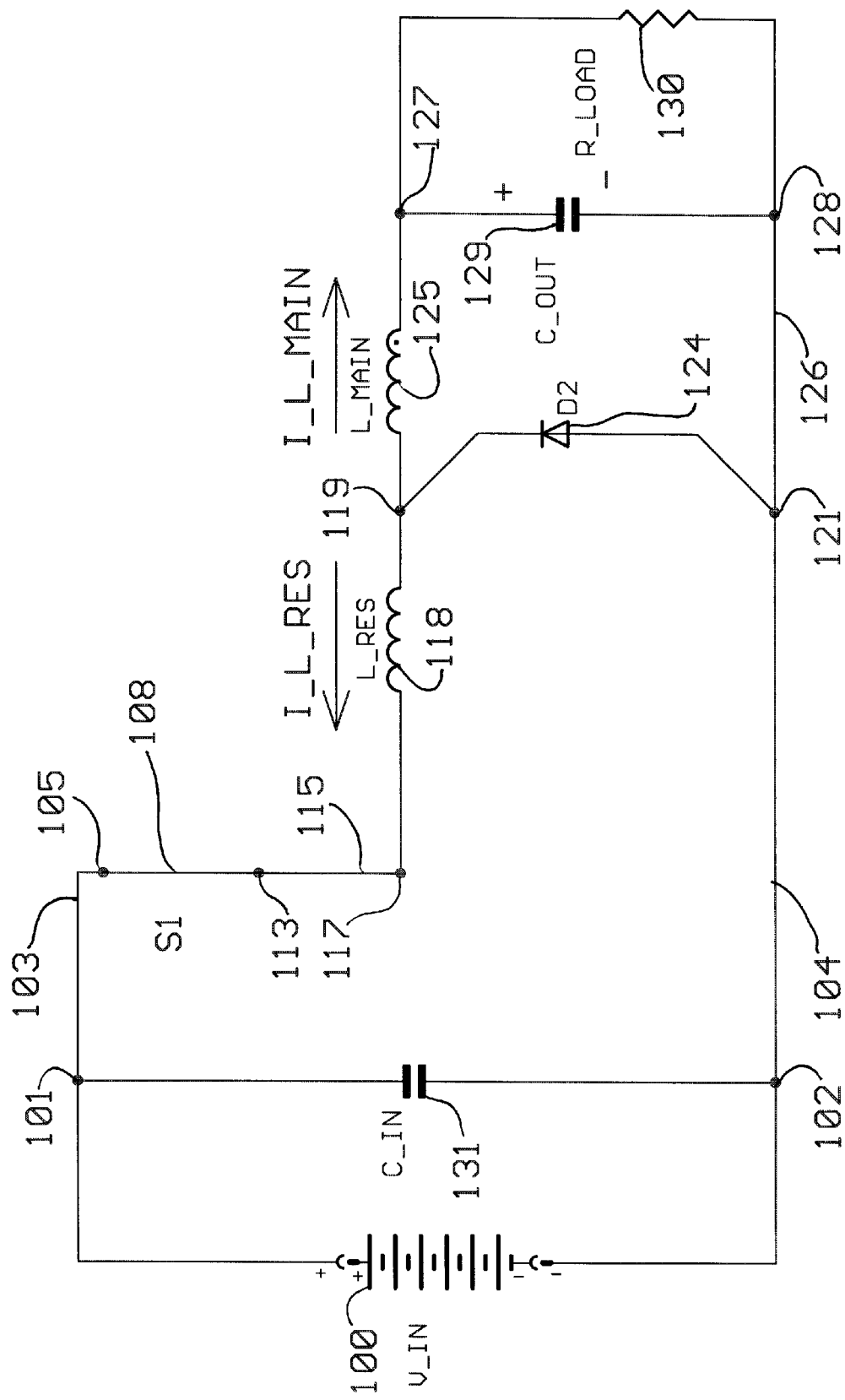
FIG. 21 illustrates a third phase of a turn on transition of the FIG. 11 circuit.
Figure 22:
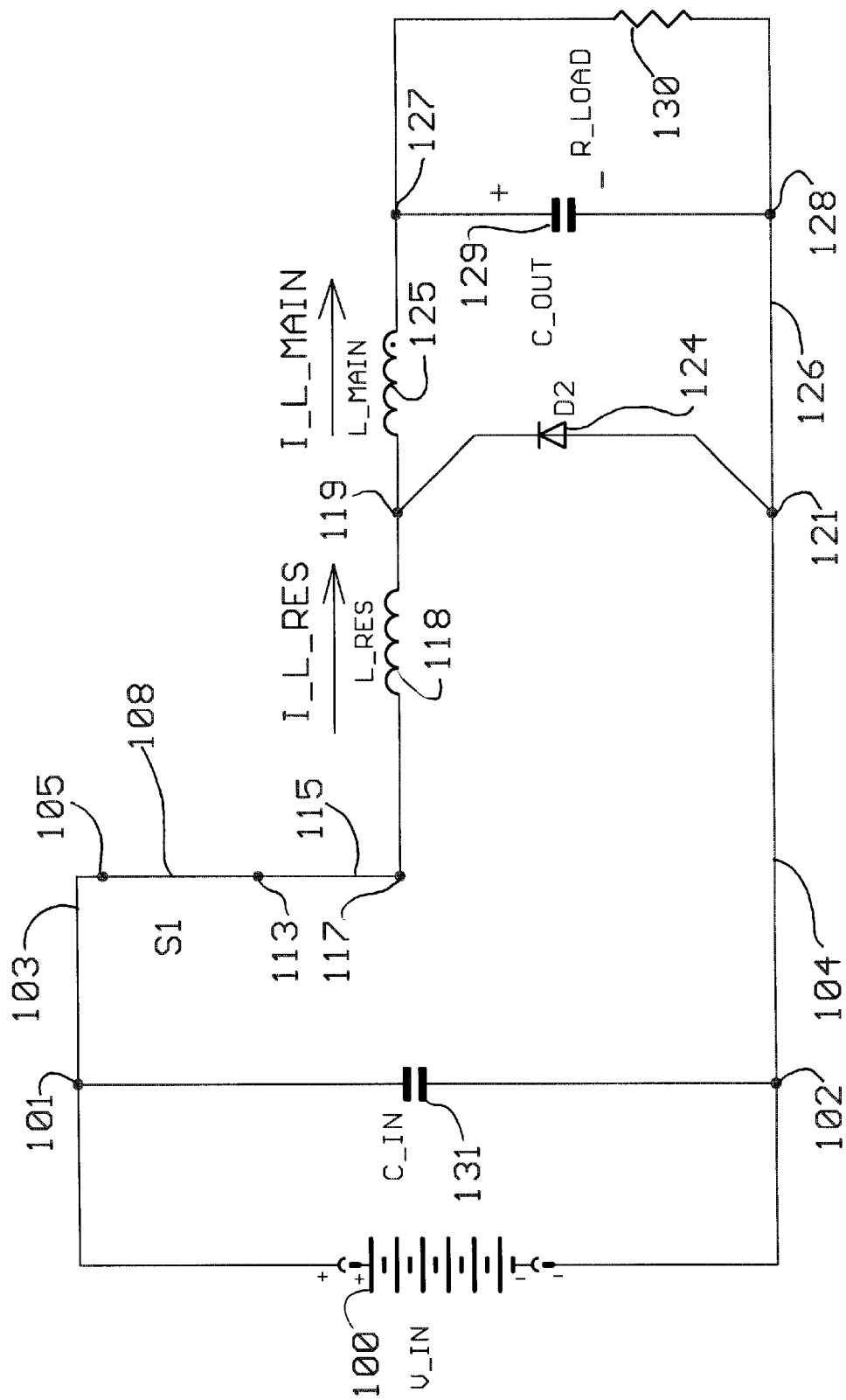
FIG. 22 illustrates a fourth phase of a turn on transition of the FIG. 11 circuit.
Figure 23:
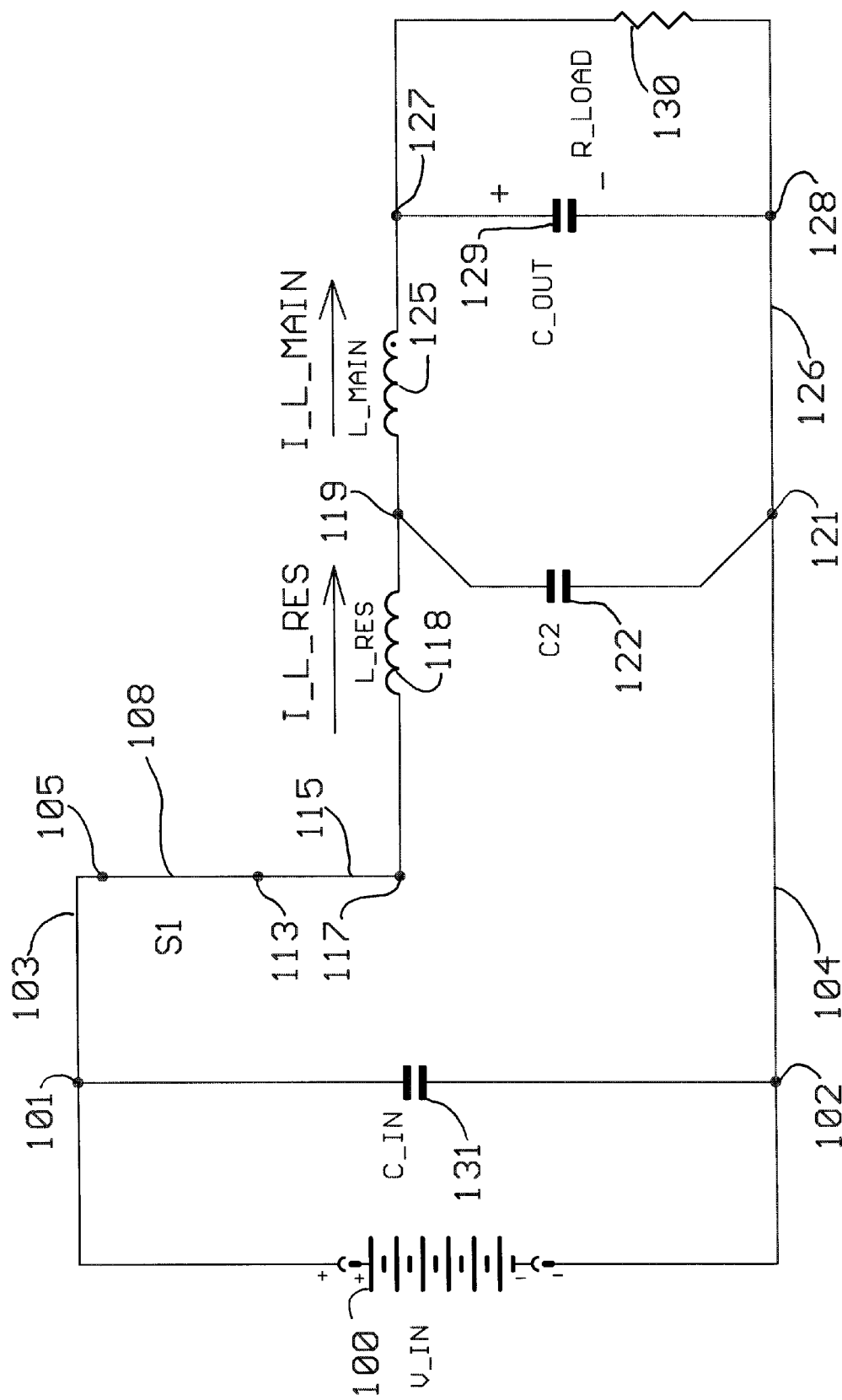
FIG. 23 illustrates a fifth phase of a turn on transition of the FIG. 11 circuit.

In operation consider an initial condition, illustrated in FIG. 13, in which the switch 108 is on and the other two switches are off. Current flows through the two inductors, 118 and 125 to the load and stored energy and current in the two inductors is increasing in magnitude, as indicated in FIGS. 12d and 12e. The current wave forms of the switches are illustrated in FIGS. 12a, 12b, and 12c. At a time determined by the control circuit the switch 108 is turned off (opened), as illustrated in FIG. 14. During the interval illustrated by FIG. 14 capacitor 107 is charged while the capacitors 110 and 122 are discharged, due to the currents and stored energies in the inductors 118 and 125, as the voltages at nodes 117 and 119 fall, until the diode 124 is forward biased as illustrated in FIG. 15. After diode 124 turns on the voltage at node 119 is clamped by diode 124, but the voltage at node 117 continues to fall until diode 112 becomes forward biased, as illustrated in FIG. 16. Shortly after diode 112 begins to conduct switches 111 and 123 are turned on (closed), as illustrated in FIG. 17. The circuits of FIGS. 17 and 18 represent the off state of the converter. During the off state the voltage applied to the small inductor 118 causes its current to decrease to zero and then increase in the negative direction, as illustrated in FIG. 18 and FIG. 12d. During the off state all of the energy stored in the inductor 118 is transferred to the capacitor 132 and back to the inductor 118 so that the energy stored in the inductor 118 is the same at the end of the off state as it was at the beginning of the off state, but the current in the inductor 118 is reversed. At the end of the off state as determined by the control circuit the switches 111 and 123 are turned off (opened) as illustrated in FIG. 19. When switch 123 is turned off the current in inductor 125 forces the diode 124 to conduct again. When switch 111 is turned off the current in inductor 118 forces current into capacitors 107 and 110 so that capacitor 110 is charged and capacitor 107 is discharged until the diode 109 is forward biased, as illustrated in FIG. 20. Shortly after diode 109 begins to conduct switch 108 is turned on (closed), as illustrated in FIG. 21. The applied voltage to the inductor 118 is now large and equal to the source 100 voltage V_IN, so that the current in the small inductor 118 changes rapidly in both magnitude and direction, as illustrated in FIG. 22 and FIG. 12d, until the current in the inductor 118 is equal to the current in inductor 125, at which time the current in diode 124 becomes zero and the voltage at node 119 begins to rise charging capacitor 124, as indicated in FIG. 23. The voltage at node 119 will rise until the voltage reaches the level of the source 100 voltage. The converter is now in the state of the initial condition as illustrated in FIG. 13, which represents the on state of the converter. During the full cycle of operation each of the three switches were turned on and off at zero voltage. The zero voltage transition switching cell comprises the switch 108 with its parasitic capacitor 107 and intrinsic diode 109, the switch 111 with its parasitic capacitor 110 and intrinsic diode 112, the capacitor 132, and the inductor 118. Although the full circuit described is a buck converter the operation of the switching cell is independent of the surrounding components. The functioning of switching cell is independent of the topology of the converter in which the cell is employed. The operation of the converter and especially the operation of the switching cell is the same if the circuit were rearranged and the topology changed to a boost, buck boost, Wittenbreder, Cuk, or virtually any other type of pulse width modulated power converter. The switching cell when substituted for the main switch in any other hard switching pulse width modulated power converter will change the power converter to one in which the first order switching losses of the main switch are eliminated. When the switching cell is substituted in a converter for the main switch the switch 108 must be oriented in the same manner as the main switch in the unaltered converter. The inductor 118 must be placed in series with the switch 108 but the inductor can be placed on either side of the main switch. The second switch 111 and capacitor 132 must be placed in series with each other and in parallel with the inductor 118. The second switch must be oriented so that the intrinsic diode of the second switch does not conduct when the main switch 108 is turned on. The universal applicability is illustrated by the figures.

Related Embodiments

Figure 24:
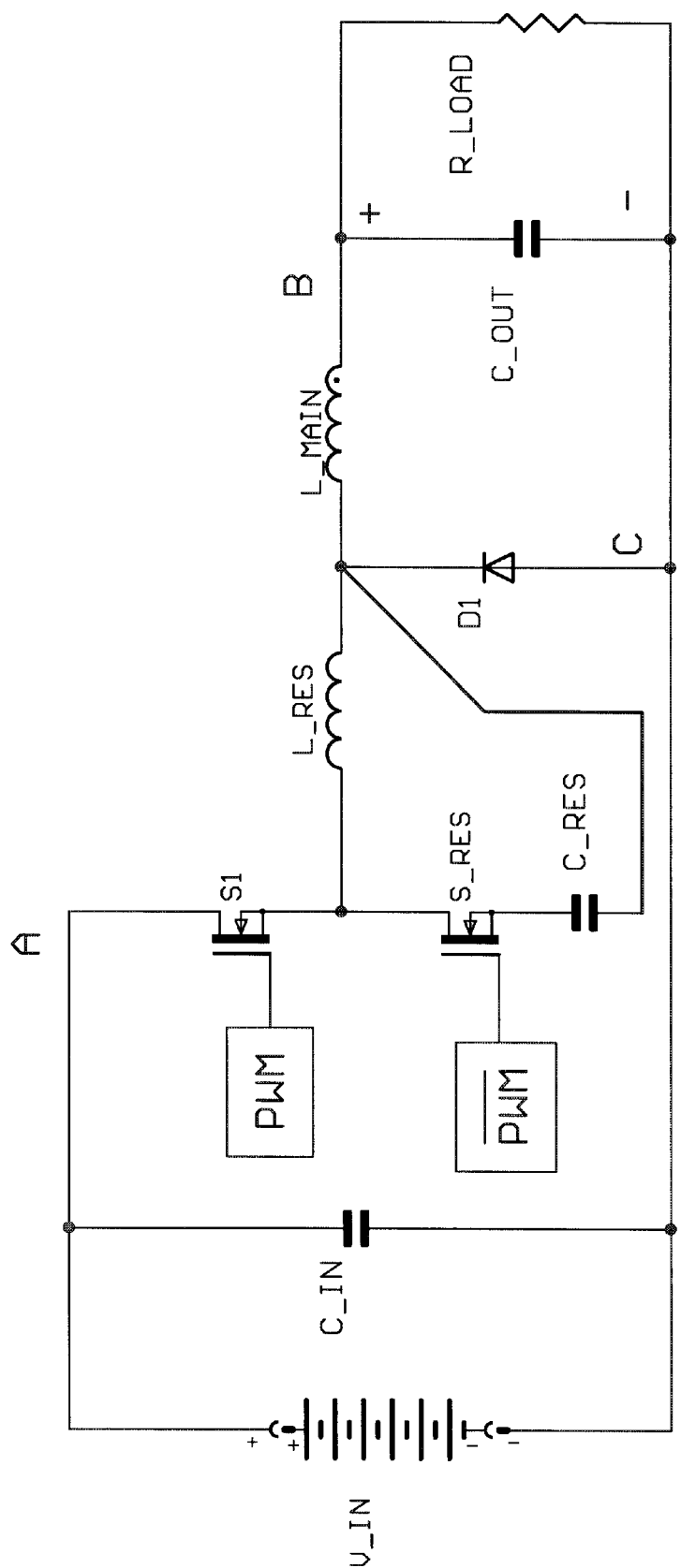
FIG. 24 illustrates an embodiment of the FIG. 11 circuit in which the S1 and S3 switches are implemented using power mosfets and the S2 switch is implemented with a diode rectifier.

FIG. 24 illustrates an embodiment of the FIG. 11 circuit in which the switches S1 and S3 are implemented with power mosfets and the switch S2 is implemented with a diode.

Figure 25:
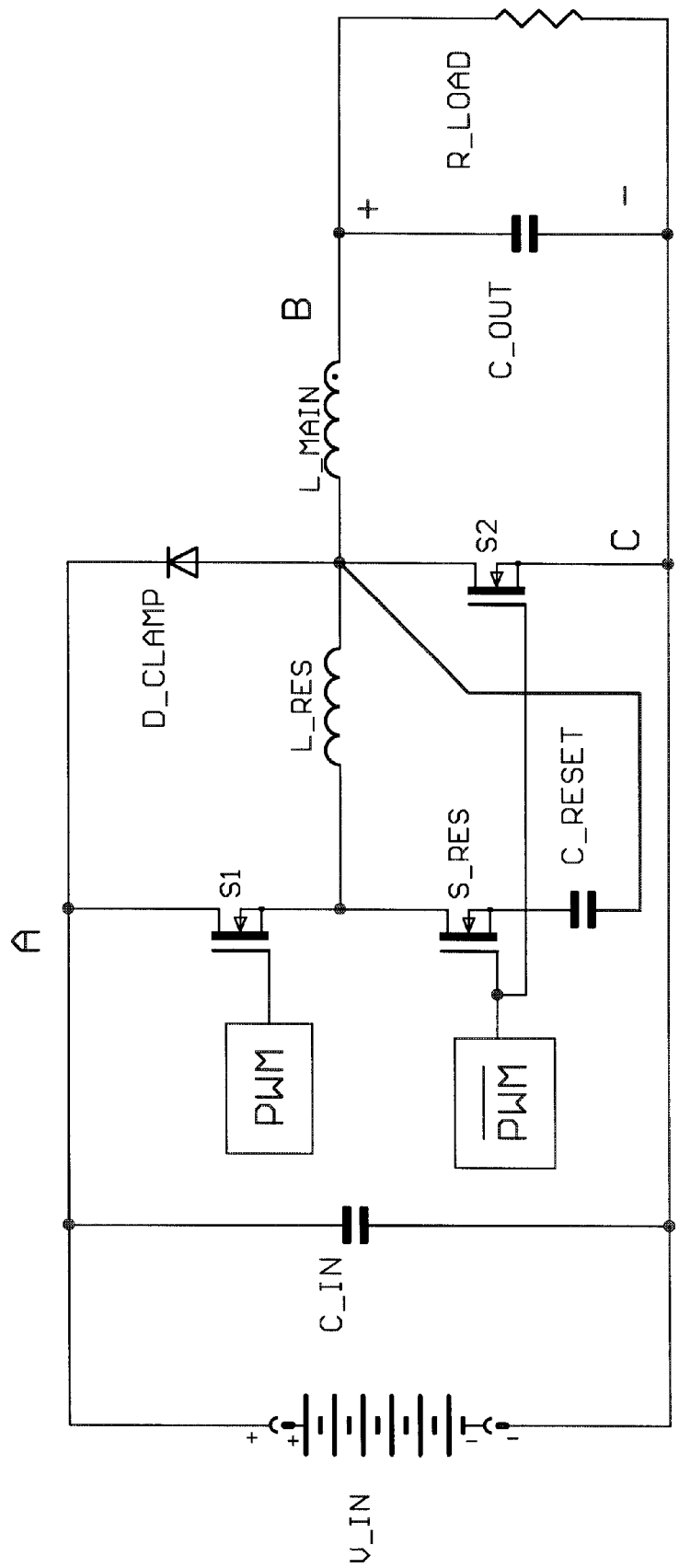
FIG. 25 illustrates an embodiment of the FIG. 11 circuit in which all three switches are implemented with power mosfets and augmented by a diode to clamp ringing associated with the small inductor and the parasitic capacitance of the second switch.

FIG. 25 illustrates an embodiment of the FIG. 11 circuit similar to the FIG. 24 circuit except that the switch S2 is implemented with a power mosfet and a diode D_CLAMP is added to clamp potential ringing associated with L_RES and C2, where C2 is the parasitic output capacitance of S2.

Figure 26:
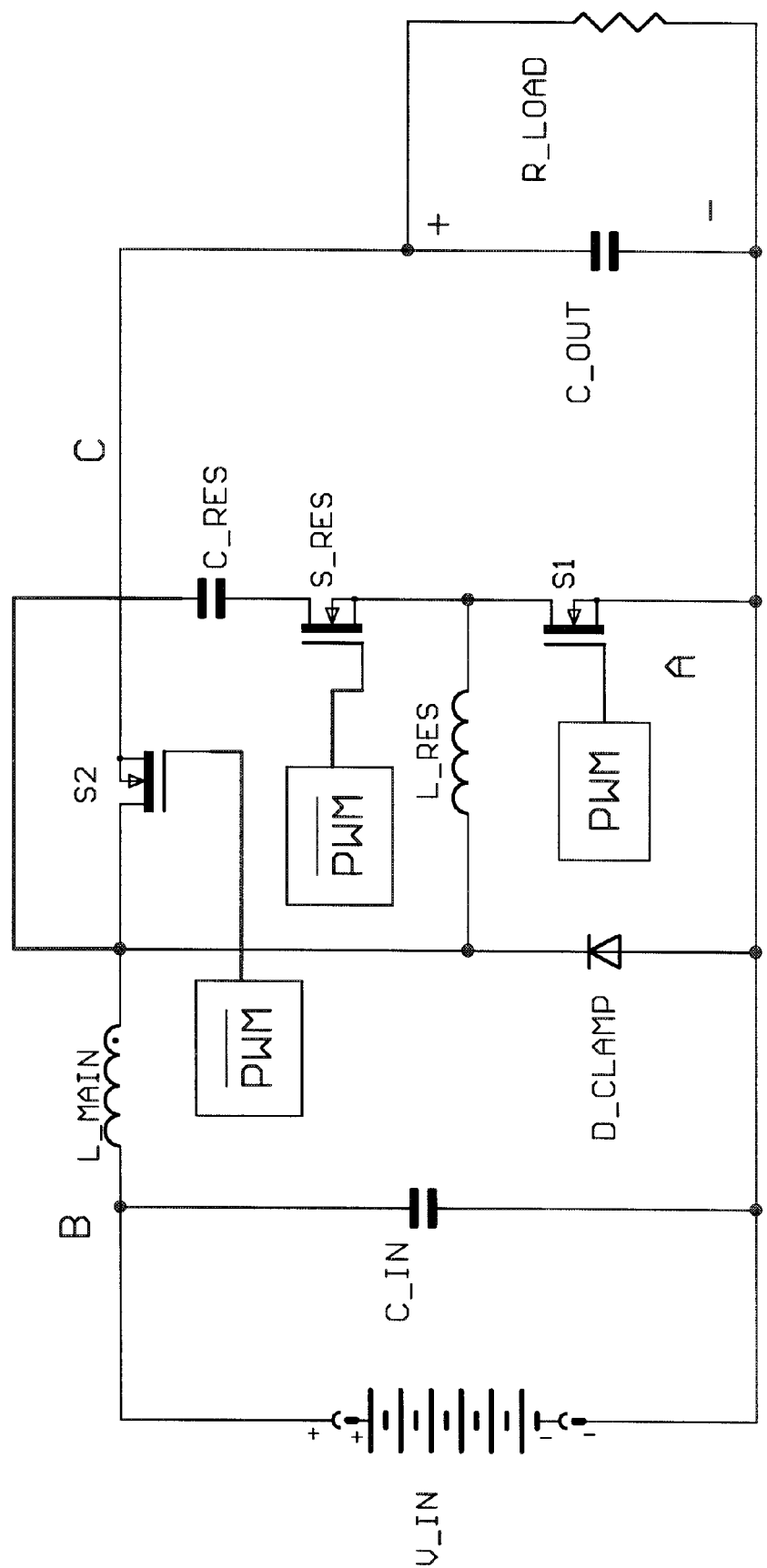
FIG. 26 illustrates the FIG. 25 circuit with its terminals rearranged to form a boost converter.

FIG. 26 shows another embodiment of the subject invention in which the components are arranged to form a boost converter. The operation of the universal zero voltage transition switching cell is identical to the buck converter, described in detail above, but the circuit is arranged so that the main choke is connected to the input's positive terminal and the main switch is connected to the negative terminal of the input.

Figure 27:
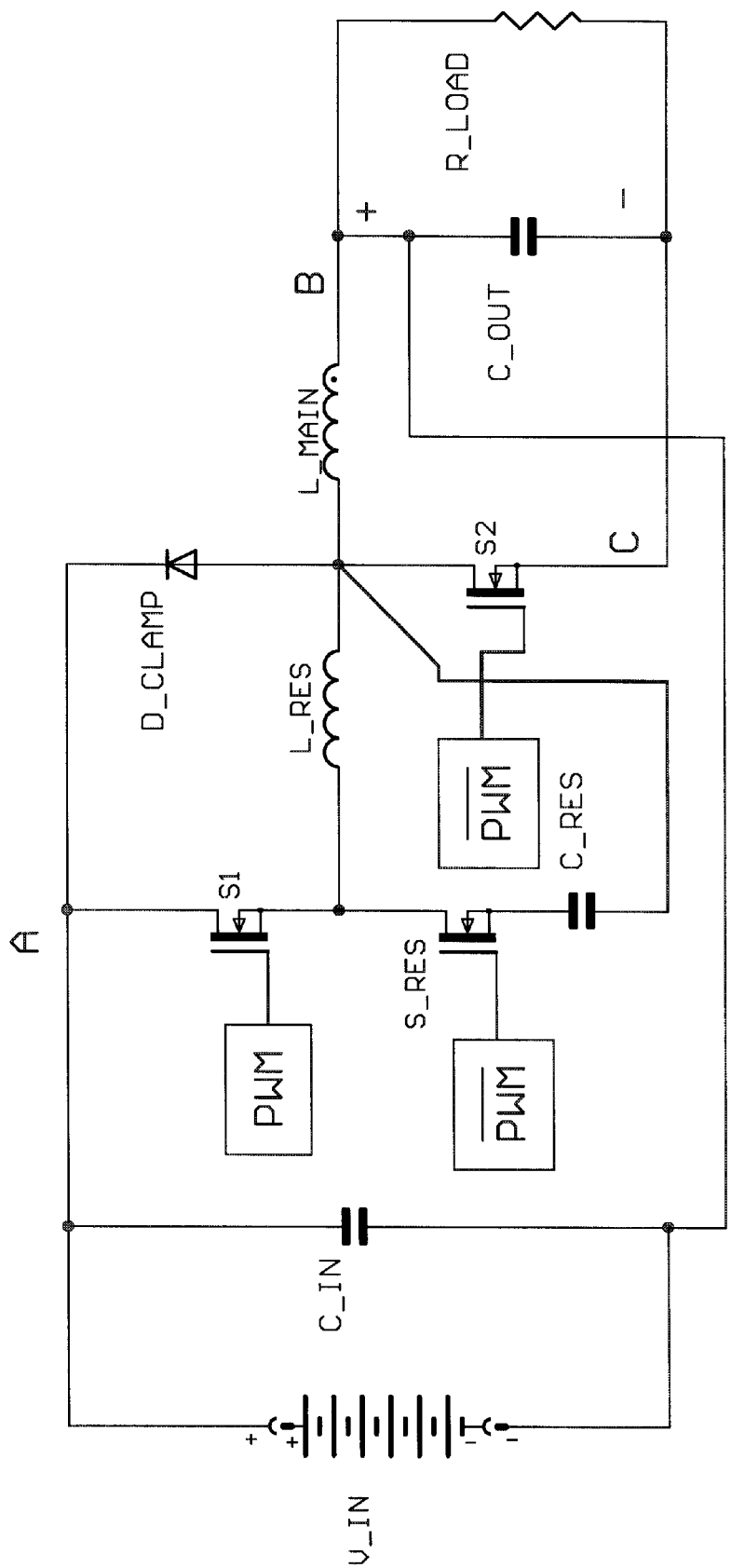
FIG. 27 illustrates the FIG. 25 circuit with its terminals rearranged to form a buck boost converter.

FIG. 27 shows another embodiment of the subject invention in which the components are arranged to form a buck boost converter. The operation of the universal zero voltage transition switching cell is identical to the buck converter, described in detail above, but the circuit is arranged so that the main choke is connected to the input's negative terminal, which is also the output's positive terminal.

Figure 28:
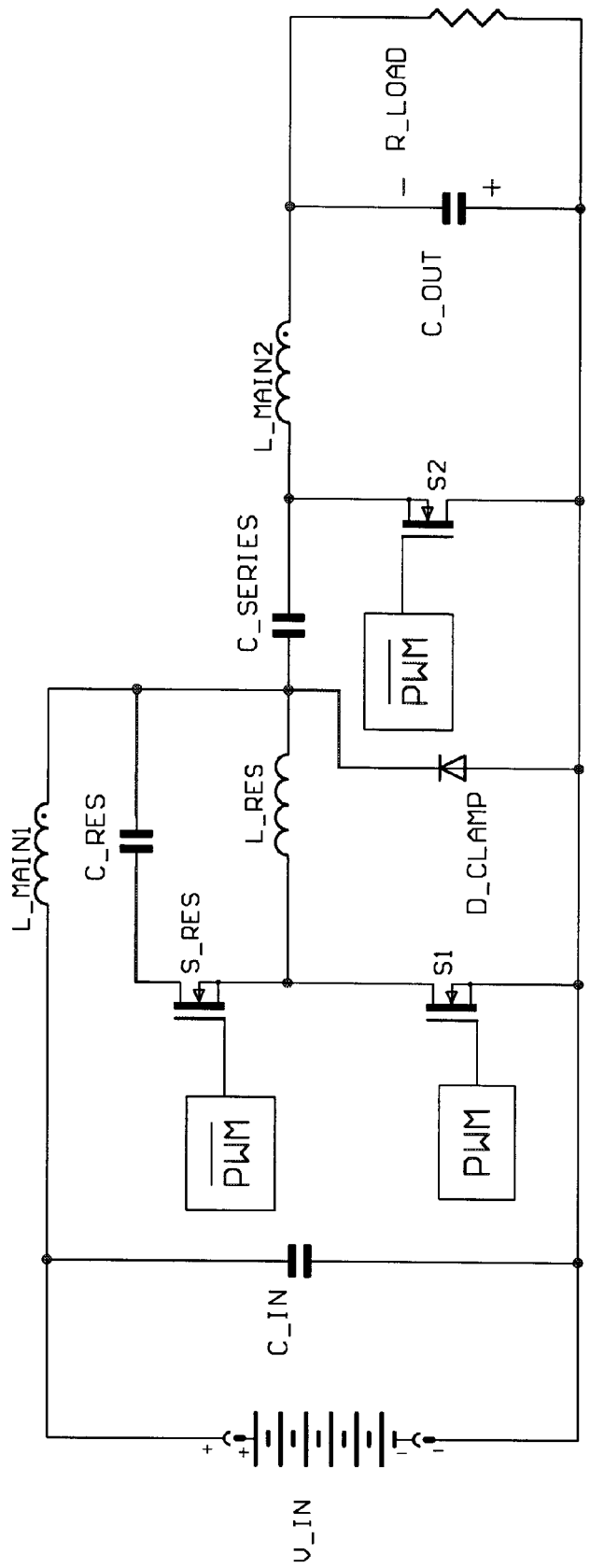
FIG. 28 illustrates a Cuk converter implementation of the subject invention.

FIG. 28 shows another embodiment of the subject invention in which the components are arranged to form a Cuk converter. The operation of the universal zero voltage transition switching cell is identical to the buck converter, described in detail above, but the circuit is arranged so that the main switch is connected to the input's negative terminal, which is also the output's positive terminal. This arrangement is much like the buck boost converter, but instead of a single main choke connected to the common point of the input and the output there are two chokes, one in series with the input positive terminal and the other in series with the output negative terminal. The terminals of the two inductors that are not connected to either the input or the output are connected to opposite ends of a capacitor. The Cuk converter has the same transfer function as the buck boost converter, but the Cuk converter also has the property of non-pulsating input and output terminal currents.

Figure 29:
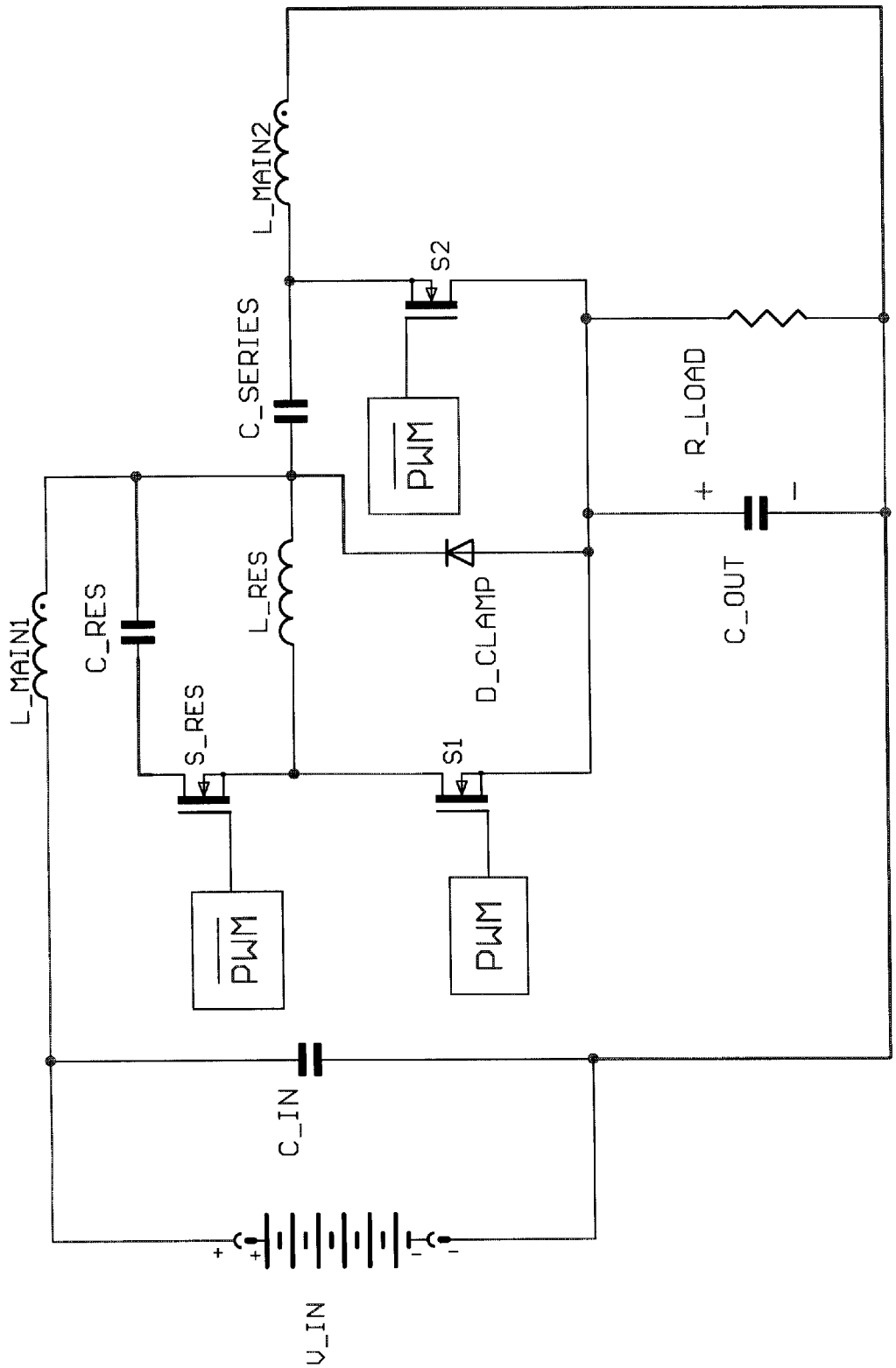
FIG. 29 illustrates a forward Wittenbreder converter implementation of the subject invention.

FIG. 29 shows another embodiment of the subject invention in which the universal zero voltage transition switching cell is applied to the forward Wittenbreder converter. The forward Wittenbreder converter is similar in construction to the Cuk converter but it has a buck transfer function and it maintains the Cuk converter's property of non-pulsating input and output terminal currents.

Figure 30:
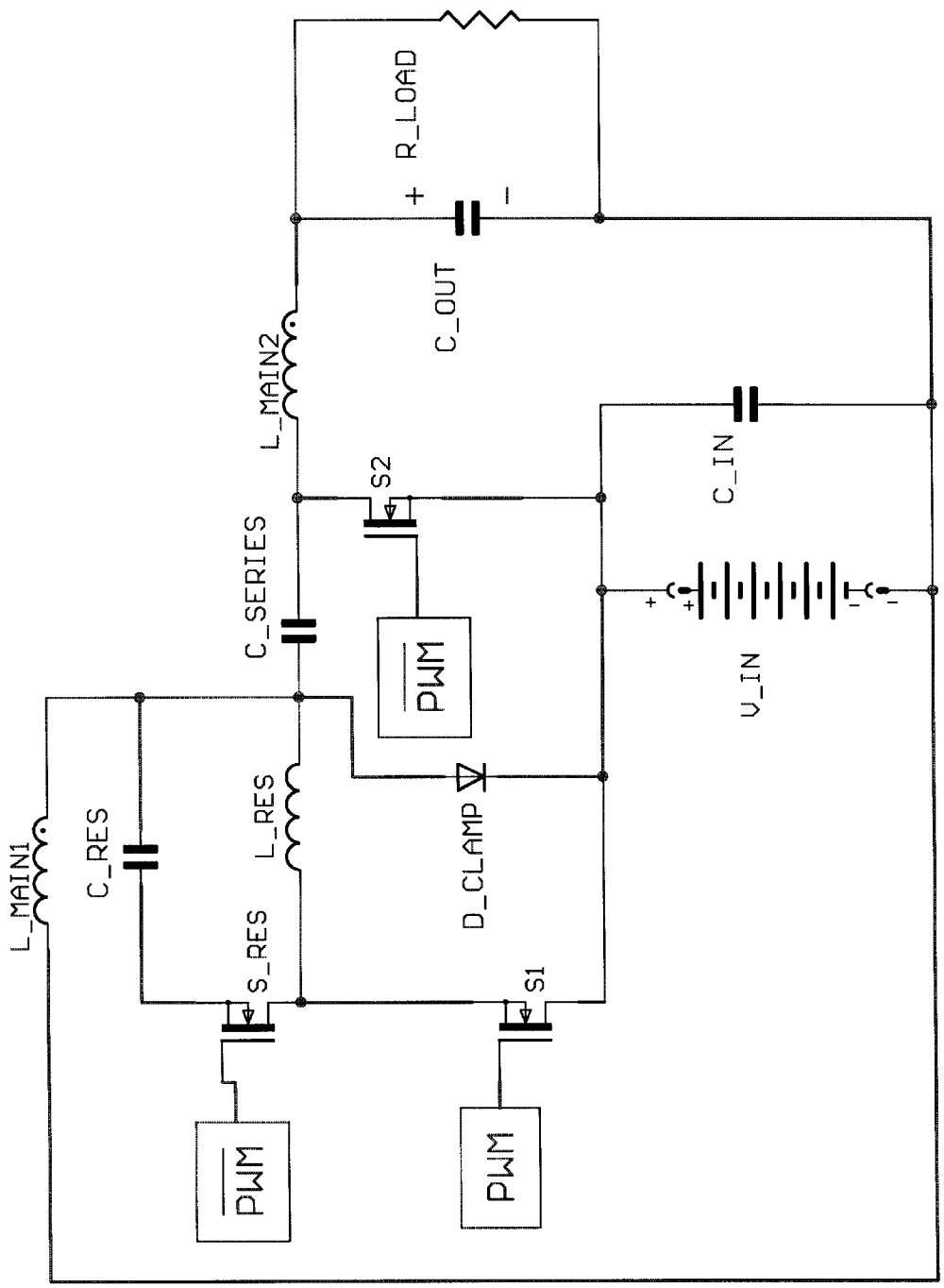
FIG. 30 illustrates a reverse Wittenbreder converter implementation of the subject invention.

FIG. 30 shows another embodiment of the subject invention in which the universal zero voltage transition switching cell is applied to the reverse Wittenbreder converter. The reverse Wittenbreder converter is similar in construction to the forward Wittenbreder converter but it has a boost transfer function and it maintains the forward Wittenbreder converter's property of non-pulsating input and output terminal currents.

Figure 31:
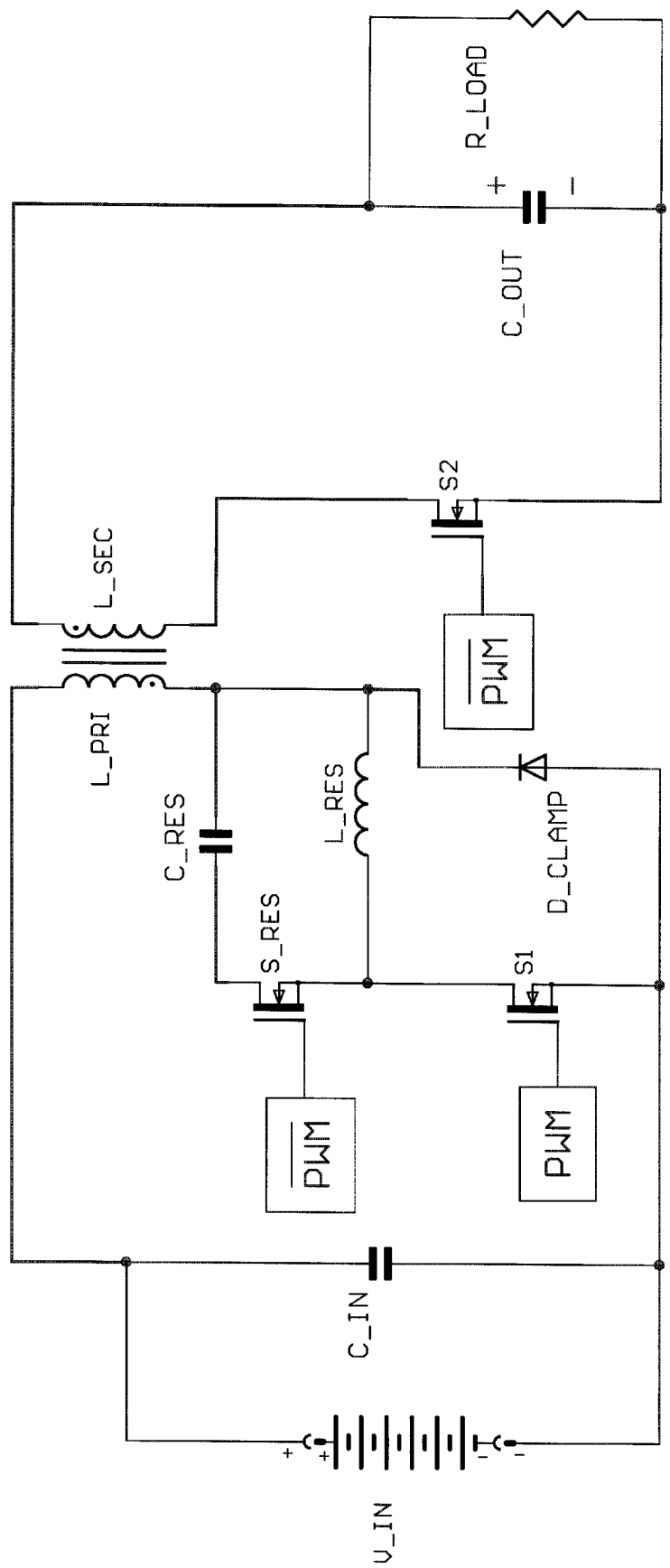
FIG. 31 illustrates a single-ended flyback converter implementation of the subject invention.

FIG. 31 shows another embodiment of the subject invention in which the universal zero voltage transition switching cell is applied to a simple single ended flyback converter.

Figure 32:
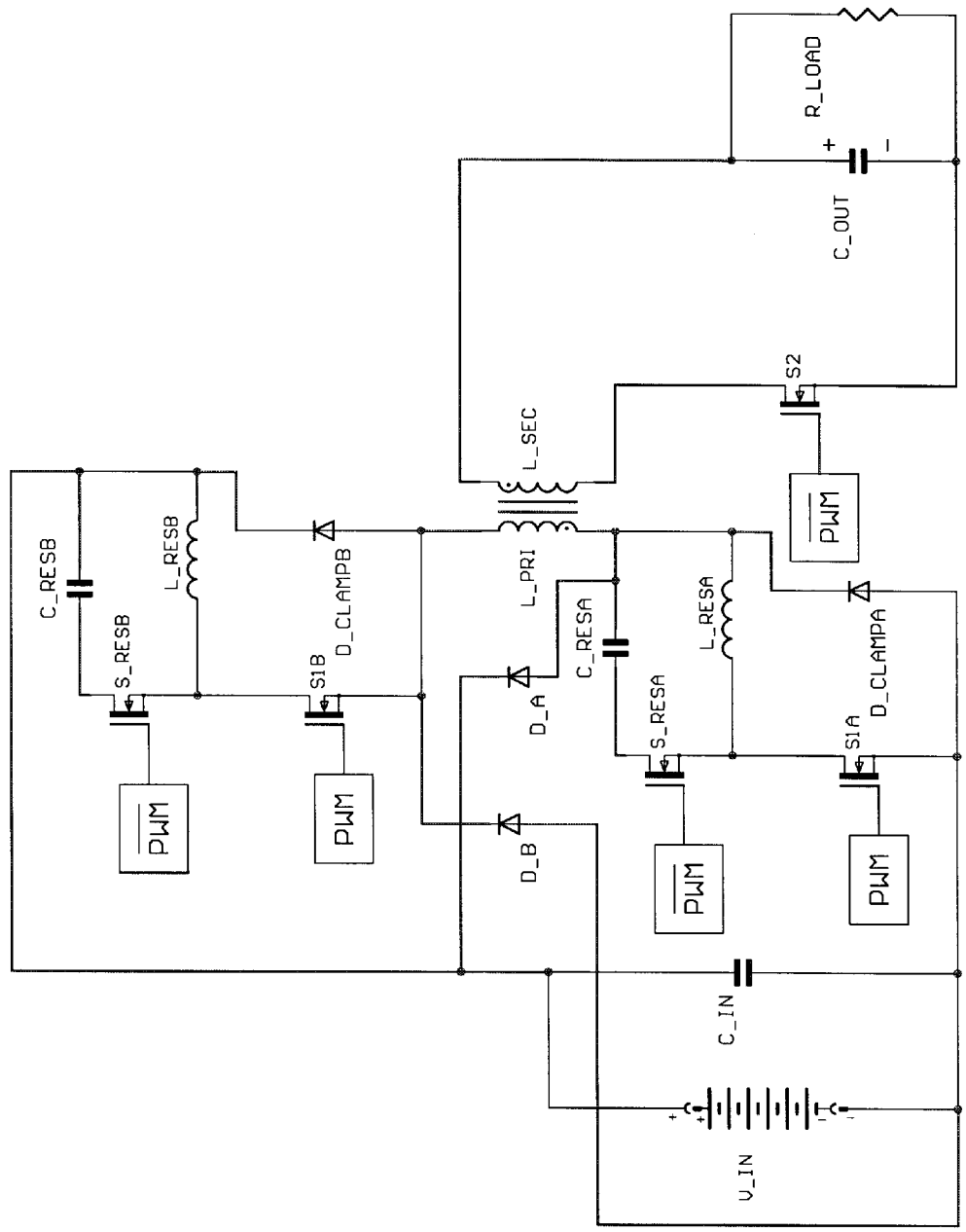
FIG. 32 illustrates a two switch flyback converter implementation of the subject invention.

FIG. 32 shows another embodiment of the subject invention in which the universal zero voltage transition switching cell is applied to a two switch flyback converter. The two switch flyback has two main switches. A universal zero voltage transition switching cell is applied to each main switch resulting in a converter in which switching losses are eliminated in both main switches.

Figure 33:
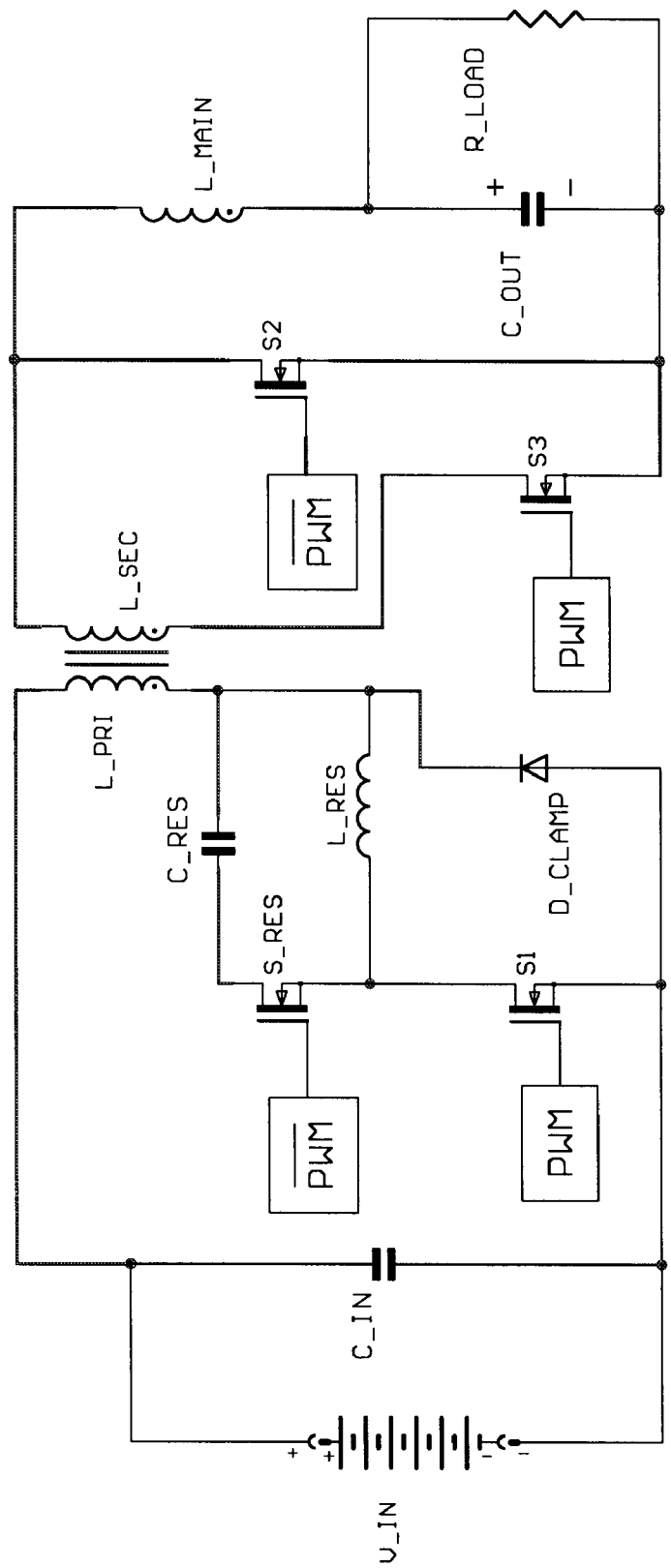
FIG. 33 illustrates a single ended forward converter implementation of the subject invention.

FIG. 33 shows another embodiment of the subject invention in which the universal zero voltage transition switching cell is applied to a single ended forward converter.

Figure 34:
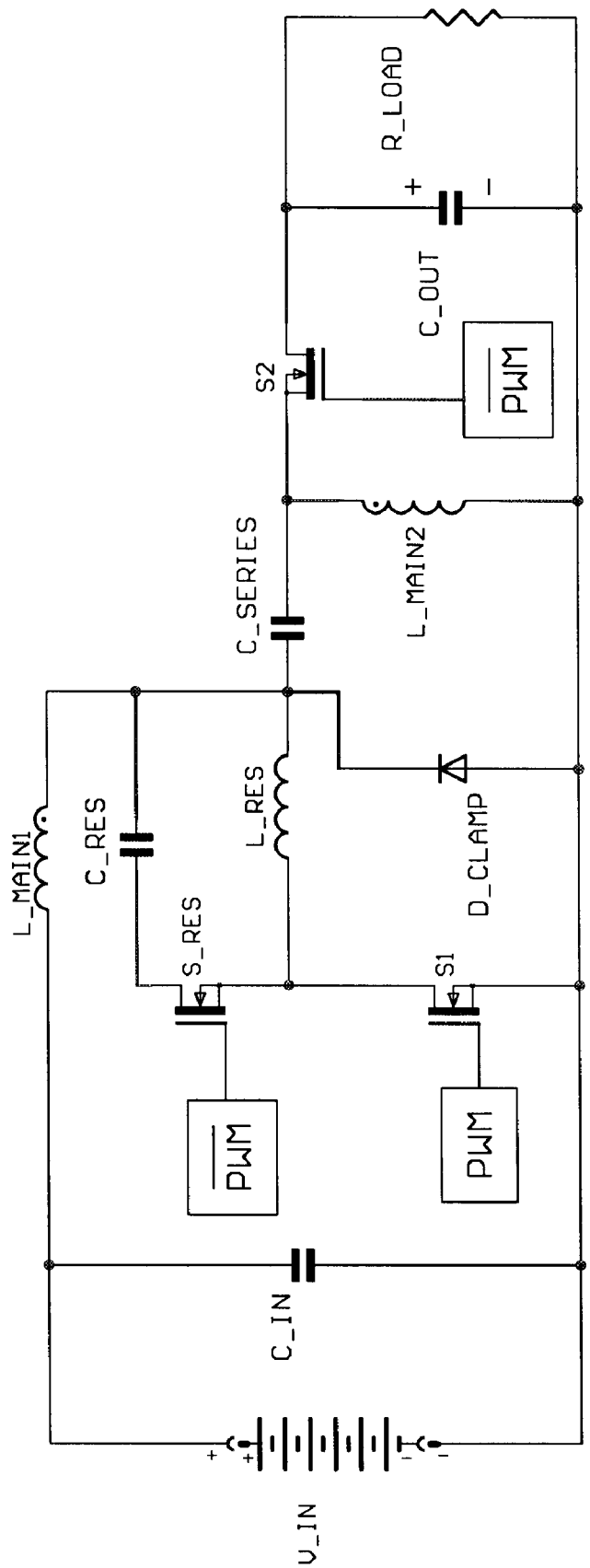
FIG. 34 illustrates a SEPIC converter implementation of the subject invention.

FIG. 34 shows another embodiment of the subject invention in which the universal zero voltage transition switching cell is applied to a SEPIC converter.

Figure 35:
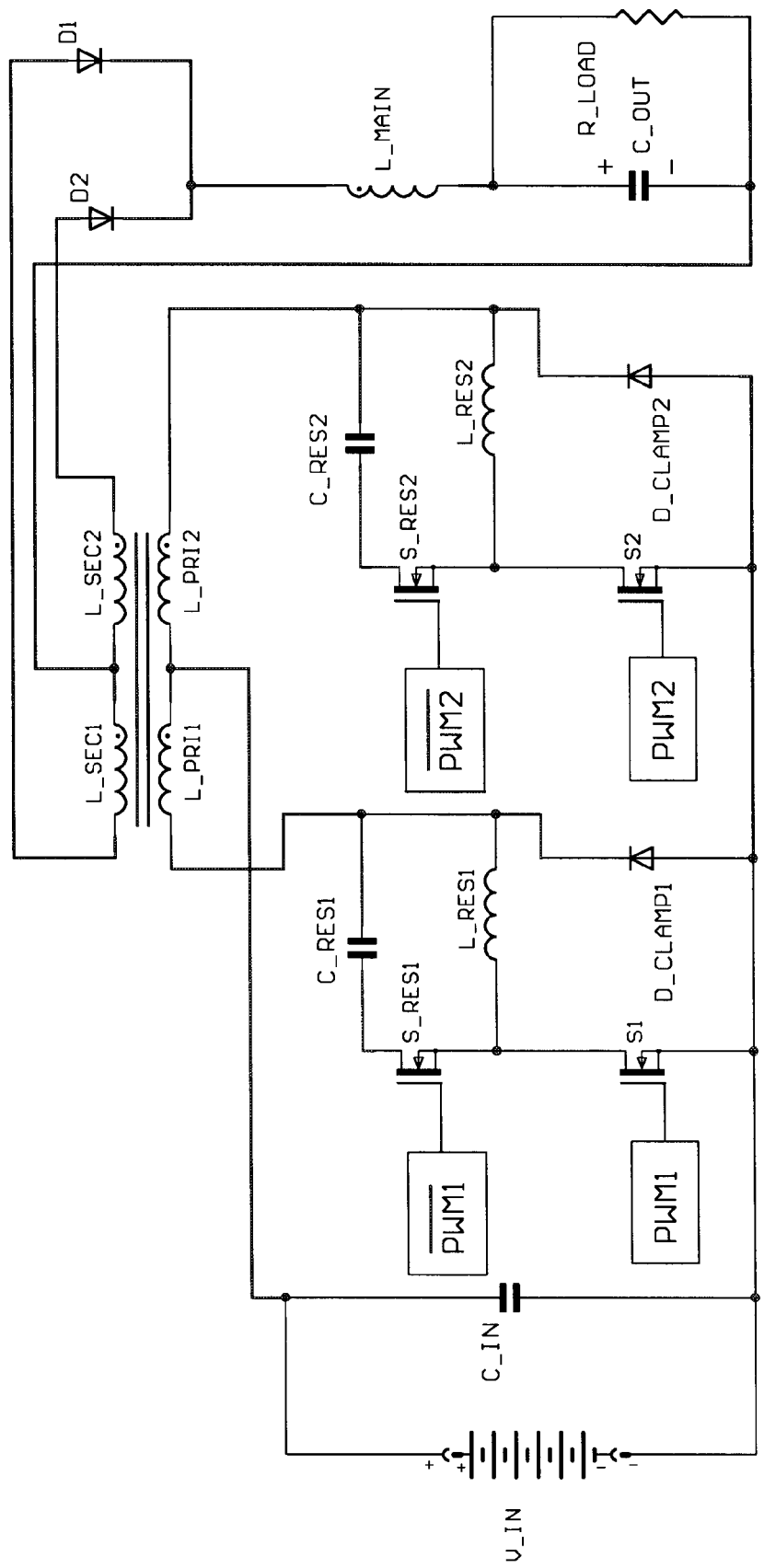
FIG. 35 illustrates a push pull forward converter implementation of the subject invention.

FIG. 35 shows another embodiment of the subject invention in which the universal zero voltage transition switching cell is applied to both main switches of a push pull forward converter.

Figure 36:
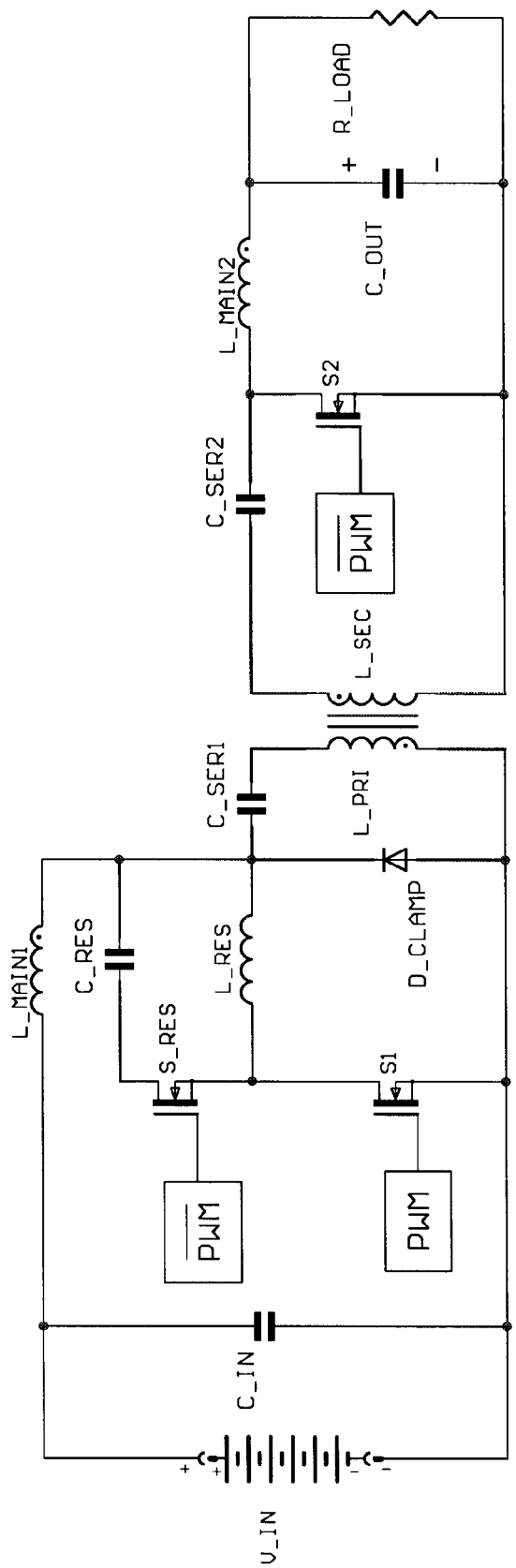
FIG. 36 illustrates a transformer coupled Cuk converter implementation of the subject invention.

FIG. 36 shows another embodiment of the subject invention in which the universal zero voltage transition switching cell is applied to a transformer coupled Cuk converter.

Figure 37:
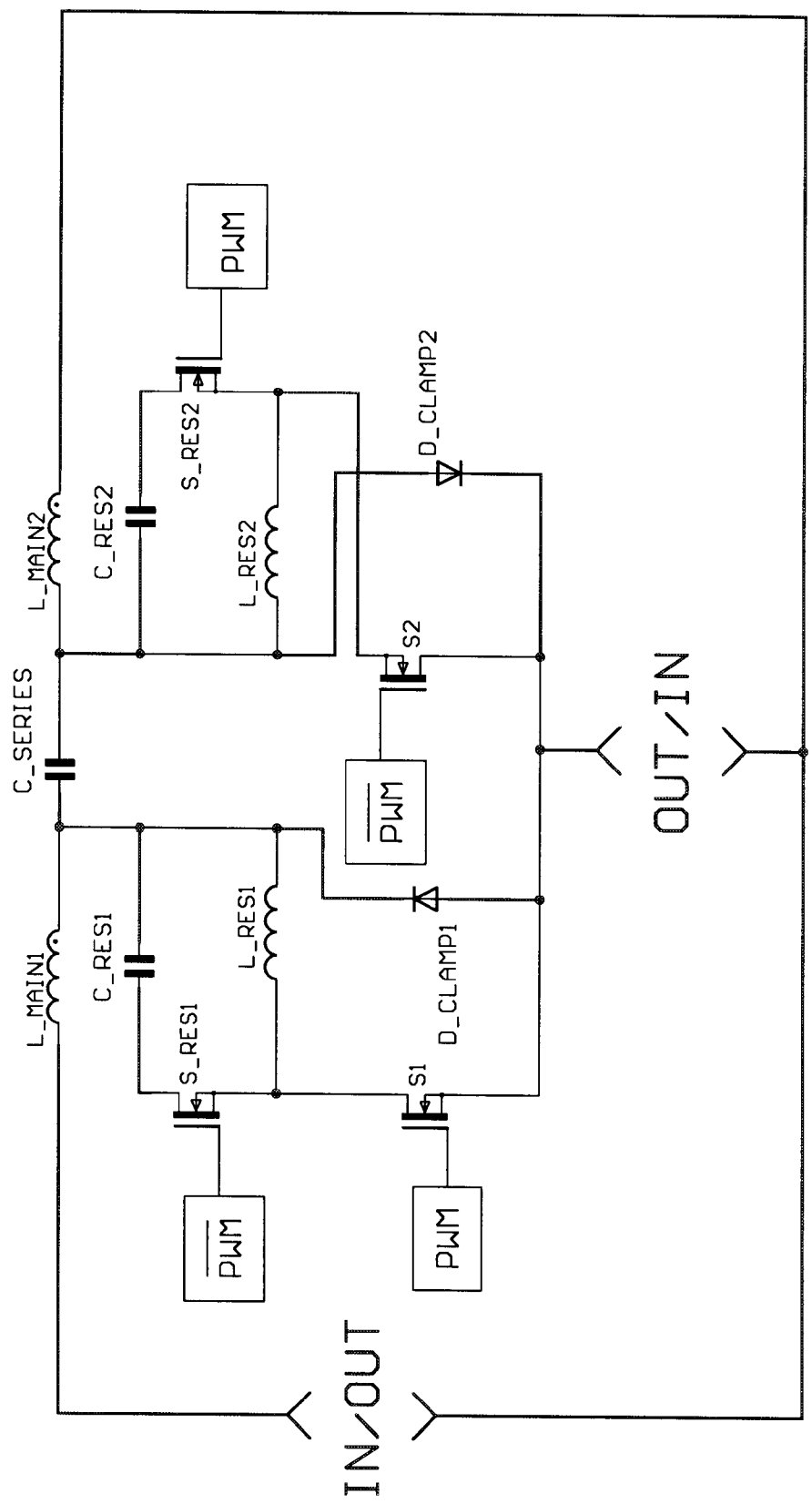
FIG. 37 illustrates a bidirectional Wittenbreder converter implementation of the subject invention.

FIG. 37 shows another embodiment of the subject invention in which the universal zero voltage transition switching cell is applied to both main switches of a bidirectional Wittenbreder converter which accomplishes zero voltage switching of all switches regardless of the direction of power flow for high efficiency and non-pulsating input and output terminal currents for low EMI.

Additional Embodiments

Additional embodiments are realized by applying the universal zero voltage transition switching cell to other pulse width modulated converter topologies. The buck, boost, buck-boost, Cuk, Wittenbreder, forward, flyback, and SEPIC converters are shown here as examples, but it is clear to one skilled in the art of power conversion that by extending the techniques illustrated and demonstrated here to other hard switching pulse width modulated topologies that these other hard switching topologies can be converted from hard switching converters to soft switching converters with the elimination of first order switching losses. Unlike other zero voltage switching schemes these desirable features can be achieved without altering the voltage and current wave forms or the component stresses of the other circuit elements of the converter. The results presented here demonstrate that the universal zero voltage transition switching cell can be applied to the main switch(es) of any hard switching pulse width modulated converter topology to change the same converter to a soft switching topology with no other changes to the converter.

Conclusion, Ramifications, and Scope of Invention

Thus the reader will see that the universal zero voltage transition switching cell of the invention provide a mechanism which when substituted for a switch in a pulse width modulated power converter with hard switching properties significantly reduces switching losses, has low component parts counts, and does not require high core losses, high output filter capacitance, or high conduction losses to accomplish zero voltage switching, relying on the energy stored in a small magnetic circuit element.

While my above description contains many specificities, these should not be construed as limitations on the scope of the invention, but rather as exemplifications of preferred embodiments thereof. Many other variations are possible. For example, there are many pulse width modulated converter topologies known to those skilled in the art that are not presented here and many yet to be invented to which application of the universal zero voltage transition switching cell will eliminate switching power losses in the converter.

Accordingly, the scope of the invention should be determined not by the embodiments illustrated, but by the appended claims and their legal equivalents.

I claim:

1. A universally applicable zero voltage transition switching cell having a first terminal and a second terminal comprising first switch means having a first terminal and a second terminal with said first terminal of said first switch means connected to said first terminal of said switching cell, a first inductor having a first terminal and a second terminal with said first terminal of said first inductor connected to said second terminal of said first switch means and with said second terminal of said first inductor connected to said second terminal of said switching cell, a switch capacitor series network having a first terminal and a second terminal with said first terminal of said switch capacitor series network connected to said first terminal of said first inductor and said second terminal of said switch capacitor series network connected to said second terminal of said first inductor comprising, a first capacitor, second switch means placed in series with said first capacitor operable substantially in anti-synchronization to said first switch means, whereby said first inductor provides energy to drive a zero voltage turn on transition for said first switch means when placed in a pulse width modulated power converter in which said switching cell is employed in place of the main switch.

2. The switching cell of claim 1 further comprising a rectifier diode coupled to said first terminal and to said second terminal of said switching cell in a parallel connection, whereby said rectifier diode clamps ringing associated with said first inductor and the parasitic capacitance(s) associated with other circuit elements external to said switching cell.

* * * * *